United States Patent
Nakano et al.

(10) Patent No.: US 9,740,209 B2
(45) Date of Patent: Aug. 22, 2017

(54) AUTONOMOUS MOVING BODY

(71) Applicant: MURATA MACHINERY, LTD., Kyoto-shi, Kyoto (JP)

(72) Inventors: Tsuyoshi Nakano, Kyoto (JP); Shoji Tanaka, Kyoto (JP)

(73) Assignee: MURATA MACHINERY, LTD., Kyoto (JP)

(*) Notice: Subject to any disclaimer, the term of this patent is extended or adjusted under 35 U.S.C. 154(b) by 0 days.

(21) Appl. No.: 14/888,261

(22) PCT Filed: Apr. 11, 2014

(86) PCT No.: PCT/JP2014/060499
§ 371 (c)(1),
(2) Date: Oct. 30, 2015

(87) PCT Pub. No.: WO2014/178272
PCT Pub. Date: Nov. 6, 2014

(65) Prior Publication Data
US 2016/0062361 A1    Mar. 3, 2016

(30) Foreign Application Priority Data

May 1, 2013   (JP) ................. 2013-096337

(51) Int. Cl.
G05D 1/02    (2006.01)
G05D 1/00    (2006.01)

(52) U.S. Cl.
CPC ......... *G05D 1/0221* (2013.01); *G05D 1/0088* (2013.01); *G05D 1/024* (2013.01); *G05D 1/0274* (2013.01); *G05D 2201/0207* (2013.01)

(58) Field of Classification Search
CPC ................. G05D 1/024; G05D 1/0274; G05D 2201/0206; G05D 1/0272;
(Continued)

(56) References Cited

U.S. PATENT DOCUMENTS 6,314,341 B1   11/2001  Kanayama
6,359,571 B1 *  3/2002  Endo ................. G01C 21/26
                                                  340/905
(Continued)

FOREIGN PATENT DOCUMENTS

EP    2 294 960 A2    3/2011
JP    2003-345437 A   12/2003
(Continued)

OTHER PUBLICATIONS

U.S. Appl. No. 15/022,310, filed Mar. 2016, Tanaka et al.*
(Continued)

*Primary Examiner* — McDieunel Marc
(74) *Attorney, Agent, or Firm* — Keating & Bennett, LLP

(57) ABSTRACT

An autonomous moving body executes a mode in which an autonomous moving body: outputs a motor control amount from travel commands input by an operator; estimates the position of the autonomous moving body on an environment map, obtains position information of obstacles near the autonomous moving body, associates position information of the obstacles with times that the position information of the obstacles were obtained, stores the same in the storage unit as environment map restoration data, generates a travel schedule, and stores the same in the storage unit. In a replication mode, the autonomous moving body estimates the position of the autonomous moving body on the environment map, obtains position information of obstacles near the autonomous moving body, reads the environment map restoration data that corresponds to the estimated position of the autonomous moving body, updates the environment map, creates a control amount for the motor, so as to travel on the updated environment map in accordance with the schedule, and inputs the same to the travel unit.

14 Claims, 17 Drawing Sheets

(58) Field of Classification Search
CPC ......... G05D 2201/0216; G05D 1/0221; G05D 1/0088; B25J 5/007
USPC .......................................................... 701/25
See application file for complete search history.

(56) References Cited

U.S. PATENT DOCUMENTS

| | | | | |
|---|---|---|---|---|
| 7,272,467 | B2* | 9/2007 | Goncalves | G01C 21/12 180/168 |
| 8,306,684 | B2* | 11/2012 | Nakano | G05D 1/024 700/258 |
| 8,515,613 | B2* | 8/2013 | Tanaka | G09B 29/106 382/103 |
| 8,924,068 | B2* | 12/2014 | Shitamoto | G05D 1/0236 701/25 |
| 9,052,013 | B2* | 6/2015 | Landes | |
| 9,286,810 | B2* | 3/2016 | Eade | G09B 29/007 |
| 9,297,455 | B2* | 3/2016 | Li | F16H 61/00 |
| 9,580,080 | B1* | 2/2017 | Letwin | B60W 50/082 |
| 9,616,896 | B1* | 4/2017 | Letwin | B60W 30/182 |
| 2009/0173561 | A1* | 7/2009 | Moriguchi | B25J 5/007 180/167 |

FOREIGN PATENT DOCUMENTS

| | | |
|---|---|---|
| JP | 2004-362022 A | 12/2004 |
| JP | 2009-163156 A | 7/2009 |
| JP | 2010-92147 A | 4/2010 |
| JP | 2010-250469 A | 11/2010 |
| JP | 2013-031389 A | 2/2013 |
| WO | 01/37060 A1 | 5/2001 |

OTHER PUBLICATIONS

Alam et al., Design and Implementation of a RF Controlled Robotic Environmental Survey Assistant System, 2014, IEEE, p. 438-442.*
Fagnant, Shared Autonomous Vehicles: Model Formulation, Sub-Problem Definitions, Implementation Details, and Anticipated Impacts, 2015, IEEE, p. 2593.*
Kinpara et al., Situation Driven Control of a Robotic Wheelchair to Follow a Caregiver, 2011, IEEE, p. 1-6.*
Laisheng et al., Multi-polar Autonomous System Grid Resource Scheduling Model and Algorithm Based on Multi-agent and GA, 2010, IEEE, p. 5868-5873.*
Modi et al., Obstacle Avoidance System in Autonomous Ground Vehicle using Ground Plane Image Processing and Omnidirectional Drive, 2015, IEEE, p. 294-601.*
English translation of Official Communication issued in corresponding International Application PCT/JP2014/060499, mailed on Nov. 3, 2015.
Official Communication issued in International Patent Application No. PCT/JP2014/060499, mailed on Jun. 3, 2014.
Official Communication issued in corresponding European Patent Application No. 14791873.4, mailed on Dec. 22, 2016.

* cited by examiner

| Angle of sensor (deg.) | Distance (mm) |
|---|---|
| .... | .... |
| 63.6 | 2525 |
| 64.32 | 2472 |
| 65.04 | 2510 |
| .... | .... |

FIG. 15A

| 0.0 | 0.0 | 0.0 | 0.0 |
|---|---|---|---|
| 1.0 | 1.0 | 1.0 | 1.0 |
| -0.2 | -0.2 | -0.2 | -0.2 |
| -0.5 | -0.5 | -0.5 | -0.5 |

FIG. 15B

| 0.0 | 0.0 | 0.0 | 0.0 |
|---|---|---|---|
| 1.0 | 1.0 | 0.0 | 1.0 |
| -0.2 | -0.2 | 1.0 | -0.2 |
| -0.5 | -0.5 | -0.2 | -0.5 |

FIG. 15C

| 0.0 | 0.0 | 0.0 | 0.0 |
|---|---|---|---|
| 1.0 | 1.0 | 1.0 | 1.0 |
| -0.4 | -0.4 | 0.8 | -0.4 |
| -1.0 | -1.0 | -0.7 | -1.0 |

AUTONOMOUS MOVING BODY

BACKGROUND OF THE INVENTION

1. Field of the Invention

The present invention relates to an autonomous moving body including an environment map generation functionality, a route planning functionality, and an autonomous moving functionality.

2. Description of the Related Art

Conventionally, an autonomous moving body, which moves autonomously in a surrounding environment has been known. In order for the autonomous moving body to move autonomously in the surrounding environment, an environment map, which represents areas where objects (called "obstacles" hereinafter) in a moving space exist and areas where no obstacle exists, is required. The various kinds of methods for obtaining the environment map are known. Recently, SLAM (Simultaneous Localization and Mapping) has received a lot of attention as a technique in which the estimation of the self-position and the generation of the environment map are performed in real time while the autonomous moving body moves. A moving robot, which is configured to generate the environment map by using geometrical data obtained by distance measurements obtained via a Laser Range Finder (LRF) or a camera through the SLAM, has been suggested.

In the method of generating the environment map using SLAM, the initial portion of the environment map sometimes does not properly coincide with the end portion of the environment map when the looped environment map is generated, due to accumulation of measurement errors (so-called "looped-route problem"). JP-A-2010-92147 suggests dividing the environment map into partial maps in order to avoid the looped-route.

In the autonomous moving body disclosed in JP-A-2010-92147, when the partial maps which form the environment map are generated, the connection points are determined, and the connection relationships are then determined by selecting the connection points of the partial map to be connected from the determined connection points. Automating this technique is difficult because it is difficult to plan in this technique how the environment map should be divided in order to generate the partial maps.

SUMMARY OF THE INVENTION

Preferred embodiments of the present invention solve looped-route problems of an environment map in an autonomous moving body.

A plurality of aspects of various preferred embodiments of the present invention will be described below. These aspects of various preferred embodiments of the present invention can be combined arbitrarily or as desired or required.

An autonomous moving body according to one aspect of various preferred embodiments of the present invention executes a teaching mode, in which a travelling schedule, which includes a set of passing times and passing point data at the passing times, is generated while the autonomous moving body travels, under a manual control of a user, from a starting position to an end position, and a replication mode, in which the autonomous moving body autonomously travels from the starting position to the end position by replicating the travelling schedule.

The autonomous moving body includes a storing unit, a travelling unit, a teaching data generation unit, a travelling control unit, an obstacle information obtaining unit, a map generation unit, and a position estimation unit.

The storing unit stores data. The travelling unit includes actuators that receive a control value.

The teaching data generation unit generates the travelling schedule and stores the travelling schedule in the storing unit. The obstacle information obtaining unit obtains position information of obstacles existing in a surrounding area. The position estimation unit estimates a self-position on an environment map. The self-position is the position of the autonomous moving body. The environment map is generated based on the position information of the obstacles obtained by the obstacle information obtaining unit. When the teaching mode is executed, the map generation unit stores the position information of the obstacles as environment map restoration data in the storing unit while associating the position information of the obstacles with time at which the position information of the obstacles has been obtained. On the other hand, when the replication mode is executed, the map generation unit reads out the environment map restoration data corresponding to the estimated self-position and updates the environment map. When the teaching mode is executed, the travelling control unit generates the control value of the actuators based on a travelling instruction inputted by the user and outputs the control value to the travelling unit. On the other hand, when the replication mode is executed, the travelling control unit generates the control value of the actuators such that the travelling unit travels on an updated environment map in accordance with the travelling schedule and to output the control value to the travelling unit.

In this autonomous moving body, the environment map restoration data are generated and stored in the storing unit while the operator manually operates the autonomous moving body. In addition, the autonomous moving body travels in accordance with the travelling schedule in the replication mode, while the autonomous moving body estimates the self-position on the environment map and time, and updates the environment map by using the environment map restoration data corresponding to the estimated self-position and the time. As such, an operability of the autonomous moving body is greatly simplified, and since the operator does not have to take the method of generating the environment map into consideration even if the travelling route is looped, the problem of not closing the looped route caused by the slippage of the wheels and the measurement errors of the sensors is solved.

Here, in the teaching mode, the teaching data generation unit associates, as the passing point data, the self-position and an orientation on the environment map, with the time at which the position information of the obstacles has been obtained every predetermined time schedule.

In this case, the autonomous moving body autonomously and accurately travels in the replication mode by replicating the travelling schedule generated in the teaching mode based on the self-position and the orientation on the environment map.

In the replication mode, the map generation unit, at every predetermined time schedule, updates the environment map that has already been generated based on the environment map restoration data corresponding to the time later than the time of a present passing point.

In this case, since the environment data restoration data is read out based on the time estimated from the self-position of the autonomous moving body on the environment map and the environment map is updated based on this data, the errors of the self-position caused by the slippage of the wheels and the measurement errors of the sensors are able to be corrected.

The autonomous moving body may further include a map matching unit that generates a local map based on the position information of the obstacles obtained by the obstacle information obtaining unit, compares the updated environment map with the generated local map, and corrects the self-position and the orientation estimated by the position estimation unit based on a result of a comparison of the generated local map and the updated environment map. Here, the passing point data in the travelling schedule corresponding to the self-position on the environment map is estimated based on the result of the comparison performed by the map matching unit.

In this case, the autonomous moving body corrects the self-position by estimating the passing point data in the travelling schedule based on the estimated self-position.

In the autonomous moving body, the map generation unit deletes data of the environment map for an area that has already been passed and is the predetermined distance away from the estimated self-position (x, y, θ), at every predetermined time schedule.

In this case, when the travelling route is looped, the secure and autonomous travelling in the replication mode is achieved by solving the problem of not closing the looped route caused due to the slippage of the wheels and the accumulation of the measurement error of the sensors.

A method according to another aspect of various preferred embodiments of the present invention is a method of generating a travelling schedule, which includes a set of passing times and passing point data at the passing times, while an autonomous moving body travels, under a manual control of a user, from a starting position to an end position. The method of generating the travelling schedule includes moving the autonomous moving body according to a travelling instruction inputted by the user; estimating a self-position on an environment map; obtaining position information of obstacles around the autonomous moving body; storing the position information of the obstacles as environment map restoration data while associating the position information of the obstacles with time at which the position information of the obstacles has been obtained; and generating the travelling schedule based on the estimated self-position.

It is acceptable that, in generating the travelling schedule, the self-position and an orientation on the environment map are associated with the time at which the position information of the obstacles has been obtained as the passing point data.

It is acceptable that the method of generating the travelling schedule further includes deleting data of the environment map for an area that has already been passed.

A method according to further aspect of various preferred embodiments of the present invention is a method of moving an autonomous moving body, in which the autonomous moving body autonomously travels from a starting position to an end position by replicating a travelling schedule. The method of travelling the autonomous moving body includes estimating a self-position on an environment map; obtaining position information of obstacles around the autonomous moving body; updating the environment map based on an environment map restoration data corresponding to an estimated self-position; and moving the autonomous moving body based on a control value, the control value being generated such that the autonomous moving body travels on an updated environment map in accordance with the travelling schedule.

In the above method of moving the autonomous moving body, the autonomous moving body travels in accordance with the travelling schedule, while the autonomous moving body estimates the self-position on the environment map and the time, and updates the environment map by using the environment map restoration data corresponding to the estimated self-position and time. Therefore, since the operator does not have to take the method of generating the environment map into consideration even if the travelling route is looped, the problem of not closing the looped route caused by the slippage of the wheels and the measurement errors of the sensors is solved.

It is acceptable that, in updating the environment map based on the environment map restoration data corresponding to the estimated self-position, the environment map that has already been generated is updated based on the environment map restoration data corresponding to the time later than the time of a present passing point.

It is acceptable that the method of moving the autonomous moving body further includes generating a local map based on the position information of the obstacles that is obtained, and comparing the updated environment map with the generated local map.

In this case, in estimating the self-position on the environment map, the self-position and an orientation on the environment map, and a passing point data in the travelling schedule corresponding to the self-position on the environment map are estimated, in accordance with a result of comparing the updated environment map with the generated local map.

It is acceptable that the method of travelling the autonomous moving body further includes deleting data of the environment map for an area that has already been passed.

According to various preferred embodiments of the present invention, an autonomous moving body solves the problem of not closing the looped route on the environment so that it is not necessary to take the division of the environment map into consideration, and the operator is able to easily teach the travelling route.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15A-15C are schematic views showing a concept of updating a global map.

DETAILED DESCRIPTION OF THE PREFERRED EMBODIMENTS

Preferred embodiments of the present invention will be described below, referring to the figures. In each figure, a common element is identified by a common reference number and the explanation of the common element will be made only once.

Figure 1:
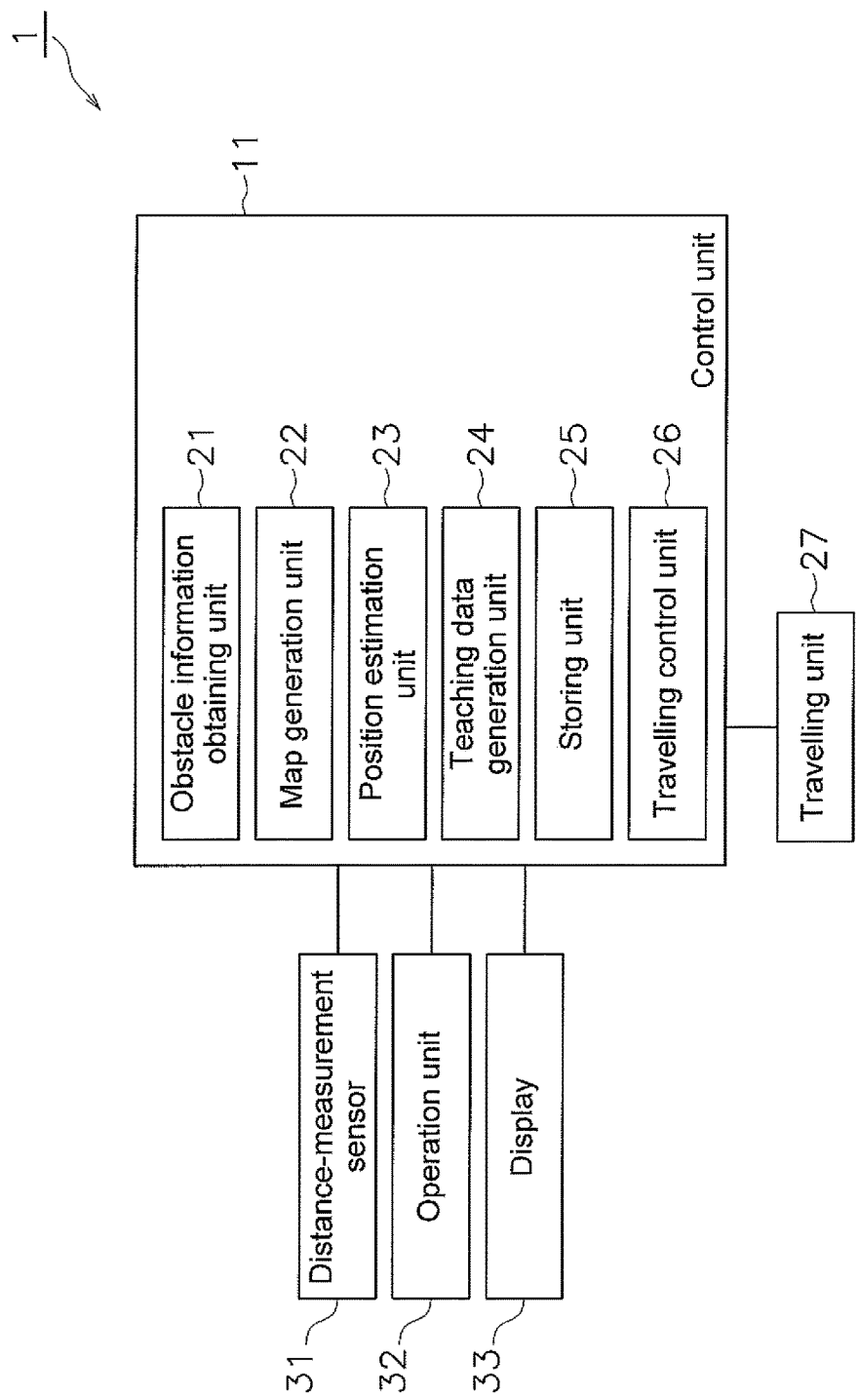
FIG. 1 is a block diagram showing a structure of an autonomous moving body according to a preferred embodiment of the present invention.

FIG. 1 is a block diagram showing a structure of an autonomous moving body according to a preferred embodiment of the present invention. The autonomous moving body 1 includes a control unit 11, a distance-measurement sensor 31, an operation unit 32, a display 33, and a travelling unit 27, which are provided in a travelling main body.

The distance-measurement sensor 31 is a sensor that detects an obstacle existing in a forward direction of the travelling of the autonomous moving body 1. The distance-measurement sensor 31 is, for example, a Laser Range Finder (LRF) that radiates a laser light pulse oscillated by a laser oscillator towards an object and calculates the distance to the object by receiving a reflection light reflected from the object with a laser receiver. The distance-measurement sensor 31 is able to radiate the laser light in a sector shape with a predetermined angle by using a rotating mirror. The distance-measurement sensor 31 may also be arranged in the back of the autonomous moving body.

The operation unit 32 is a user interface that is operated by an operator when the autonomous moving body 1 travels under the manual operation, and includes a throttle which receives instructions of travelling speed, a handle which receives instruction of travelling direction, and etc. The display 33 displays information related to present travelling statuses and other kinds of information, and can include a liquid crystal display, a LED lamp, and etc. The travelling unit 27 includes wheels (not shown in the figures) that travel on a travelling route and travelling motors (not shown in the figures) as the actuators that drive the wheels.

The control unit 11 preferably is a computer including CPU, RAM, and ROM and controls the travelling by executing programs. The control unit 11 is configured or programmed to include an obstacle information obtaining unit 21, a map generation unit 22, a position estimation unit 23, a teaching data generation unit 24, a storing unit 25, and a travelling control unit 26.

The obstacle information obtaining unit 21 obtains position information of obstacles around the autonomous moving body 1 based on a detection signal of the distance-measurement sensor 31. The map generation unit 22 generates an environment map including the travelling route of the autonomous moving body 1 as a global map based on the position information of the obstacles obtained by the obstacle information obtaining unit 21.

The position estimation unit 23 estimates a self-position on the global map. The travelling control unit 26 interprets inputted travelling instructions, generates control value of the actuators, and outputs the control value to the travelling unit 27. The teaching data generation unit 24 generates a travelling schedule that includes a set of passing times and passing point data at the passing times. The storing unit 25 stores the above-described travelling schedule and environment map restoration data. The environment map restoration data is the data in which the position information of the obstacles around the autonomous moving body is associated with the time at which the position information of the obstacles has been obtained, and is generated by the map generation unit 22.

The autonomous moving body 1 executes a teaching mode in which the autonomous moving body 1 is driven based on the manual operation of the operator. In the teaching mode, between a starting position and an end position, travelling instructions instructed by the manual operation of the operator are received by the travelling control unit 26 via the operation unit 32, the travelling control unit 26 then generates the control value of the actuators. Consequently, the autonomous moving body 1 is made to travel by the travelling unit 27. In executing the teaching mode, the obstacle information obtaining unit 21 obtains the position information of the obstacles at every predetermined time schedule, based on the signals outputted from the distance-measurement sensor 31. The position estimation unit 23 estimates the self-position and an orientation of the autonomous moving body 1 at every predetermined time schedule, based on the quantity of the movement by the travelling unit 27, and the position estimation unit 23 corrects the estimated self-position based on the position information of the obstacles obtained by the obstacle information obtaining unit 21. The teaching data generation unit 24 stores, in the storing unit 25, the travelling schedule in which the self-position and the orientation on the global map as passing point data are associated with the passing times.

The autonomous moving body 1 executes a replication mode in which the autonomous moving body 1 travels autonomously in accordance with the travelling schedule stored in the storing unit 25.

In the replication mode, the following processes are executed at every predetermined time schedule. First, the position estimation unit 23 estimates the self-position on the global map. Next, the obstacle information obtaining unit 21 obtains the position information of the obstacles around the autonomous moving body 1. Then, the map generation unit 22 reads out the environment map restoration data stored in the storing unit 25 and updates the global map, based on the estimated self-position. Finally, the travelling control unit 26 generates the control value of the actuators such that the travelling unit 27 (the autonomous moving body 1) travels in accordance with the travelling schedule on the updated global map, and outputs the control value to the travelling unit 27.

The autonomous moving body according to the first preferred embodiment of the present invention will be described below.

Figure 2:
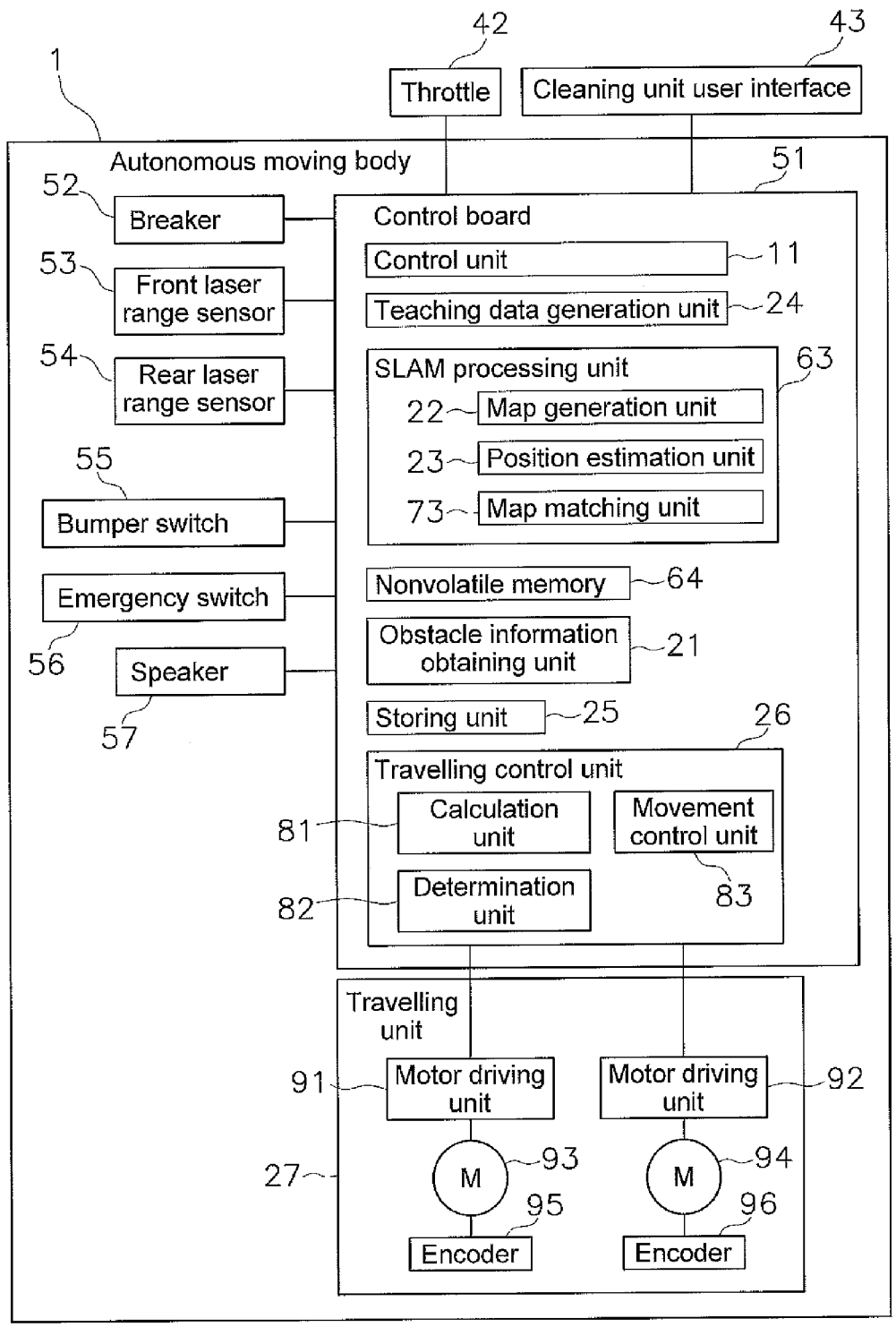
FIG. 2 is a control block diagram showing a cleaning robot according to a preferred embodiment of the present invention.

FIG. 2 is a block diagram of the cleaning robot in which the first preferred embodiment is preferably used.

The cleaning robot 40 includes the autonomous moving body 1, a throttle 42, and a cleaning unit user interface 43. The cleaning robot 40 further includes a cleaning unit (not shown in the figures). The cleaning unit is arranged at the lower portion of the autonomous moving body 1 and cleans a floor while the autonomous moving body 1 travels.

The throttle 42 corresponds to the operation unit 32 of FIG. 1 and receives instruction inputs by the manual operations of the operator. The throttle 42 can be throttle grips which are arranged independently in both right and left sides, and receive the instruction inputs as the angles of the axial rotation of the throttle grips. Alternatively, the throttle 42 can be a combination of a throttle grip that receives forwarding speeds, and a handle that receives steering direction instructions. Moreover, the throttle 42 can be a combination of the throttle levers and other input apparatuses.

The cleaning unit user interface 43 receives instructions related to cleaning operations performed by the cleaning unit (not shown in the figures) from the operator. The cleaning unit user interface 43 can be, for example, a combination of buttons, touch panels, and switches.

The autonomous moving body 1 includes a control board 51, a breaker 52, a front laser range sensor 53, a rear laser range sensor 54, a bumper switch 55, an emergency switch 56, a speaker 57, and a travelling unit 27.

The breaker 52 is a main power switch that supplies or blocks a source voltage from a battery (not shown in the figures) to the each unit of the autonomous moving body 1 by the operation of the operator. The front laser range sensor 53 detects the position information of the obstacles existing in front of the autonomous moving body 1. The front laser range sensor 53 measures the distance between the autonomous moving body 1 and the obstacle by radiating the laser light horizontally with a predetermined angle range and receiving the reflection light reflected by the obstacle. The rear laser range sensor 54 detects the position information of the obstacles existing in back of the autonomous moving body 1. The rear laser range sensor 54 measures the distance between the autonomous moving body 1 and the obstacle by radiating the laser light horizontally with a predetermined angle range and receiving the reflection light reflected by the obstacle.

The bumper switch 55 is a pressure sensitive switch that is attached to the outer periphery of a body of the autonomous moving body 1. The bumper switch 55 detects the contact with the obstacle and outputs a detection signal. The emergency switch 56 receives an instruction that stops the operations of the autonomous moving body 1. The emergency switch 56 is a switch that can be operated by the operator. The speaker 57 notifies the operator with sound of various kinds of information during the operation of the autonomous moving body 1.

The control board 51 is a circuit board that preferably includes a CPU, a ROM, and a RAM. The control board 51 preferably includes the control unit 11, the teaching data generation unit 24, an SLAM processing unit 63, a nonvolatile memory 64, the obstacle information obtaining unit 21, the storing unit 25, and the travelling control unit 26.

The storing unit 25 stores various kinds of data. The storing unit 25 stores the travelling schedule that is generated by the teaching data generation unit 24 (described later), and the environment map restoration data that is generated by the map generation unit 22 (described later). The storing unit 25 stores the travelling schedule and the environment map restoration data that are generated in the teaching mode, by associating the travelling schedule and the environment map restoration data with times or identifiers that are associated with times.

The control unit 11 is a microprocessor on the control board 51, and is configured or programmed to define and control the units of the autonomous moving body 1 by executing predetermined programs. The teaching data generation unit 24 generates the travelling schedule that is a set of the passing times and the passing point data at the passing times in the teaching mode.

The SLAM processing unit 63 is a functional block that executes an SLAM (Simultaneous Localization and Mapping) process that estimates the self-positions and generates the environment map simultaneously. The SLAM processing unit 63 is configured or programmed to include the map generation unit 22, the position estimation unit 23, and a map matching unit 73.

The map generation unit 22 generates the local map and the global map (environment map) based on the position information of the obstacles obtained by the obstacle information obtaining unit 21. In the teaching mode, the map generation unit 22 associates the position information of the obstacles around the autonomous moving body 1 with the time at which the position information of the obstacles has been obtained, then stores the position information of the obstacles associated with the time as the environment map restoration data in the storing unit 25.

In addition, in the replication mode, the map generation unit 22 reads out the environment map restoration data that corresponds to the time later than the present passing point from the storing unit 25, and updates the global map based on the read-out environment map restoration data.

The position estimation unit 23 estimates the present self-position by adding a quantity of the movement from the previous self-position to the previous self-position. The map matching unit 73 corrects the self-position estimated by the position estimation unit 23 by comparing the local map generated based on the position information of the obstacles around the autonomous moving body 1, with the global map updated by the map generation unit 22.

The nonvolatile memory 64 stores a boot program of the control board 51, a travelling control program, and various kinds of parameters. The obstacle information obtaining unit 21 obtains the position information of the obstacles around the autonomous moving body 1, based on the detection signals from the front laser range sensor 53 and the rear laser range sensor 54.

The travelling control unit (motion controller) 26 generates the control value of the actuators of the travelling unit 27 based on the received travelling instructions and outputs the control value to the travelling unit 27. In the teaching mode, the received travelling instruction is the inputted instruction that is inputted by the operator via the throttle 42. On the other hand, in the replication mode, the received travelling instruction is the travelling instruction that is generated based on the self-position on the global map estimated by the SLAM processing unit 63, the updated global map, and the travelling schedule.

The travelling control unit 26 includes a calculation unit 81, a determination unit 82, and a movement control unit 83.

The determination unit 82 interprets the received travelling instruction. The calculation unit 81 calculates the control value of the actuators of the travelling unit 27, based on the travelling instructions interpreted by the determination unit 82. The movement control unit 83 outputs the control value calculated by the calculation unit 81 to the travelling unit 27.

The travelling unit 27 includes a pair of motors 93, 94 corresponding to two wheels (not shown in the figures), encoders 95, 96 that detect rotation position of the motors, and driving units 91, 92.

The motor driving unit (motor driver) 91 feed-back controls the motor 93 based on the control value received from the travelling control unit 26 and the rotation position of the motor 93 detected by the encoder 95. Likewise, the motor control unit 92 feed-back controls the motor 94 based on the control value received from the travelling control unit 26 and the rotation position of the motor 94 detected by the encoder 96.

The teaching data generation unit 24, the obstacle information obtaining unit 21, the travelling control unit 26, and the SLAM processing unit 63 can be functional blocks in which the control unit 11 achieves their functionalities by executing one or more programs. Alternatively, the teaching data generation unit 24, the obstacle information obtaining unit 21, the travelling control unit 26, and the SLAM processing unit 63 can be independent integrated circuits.

Figure 3:
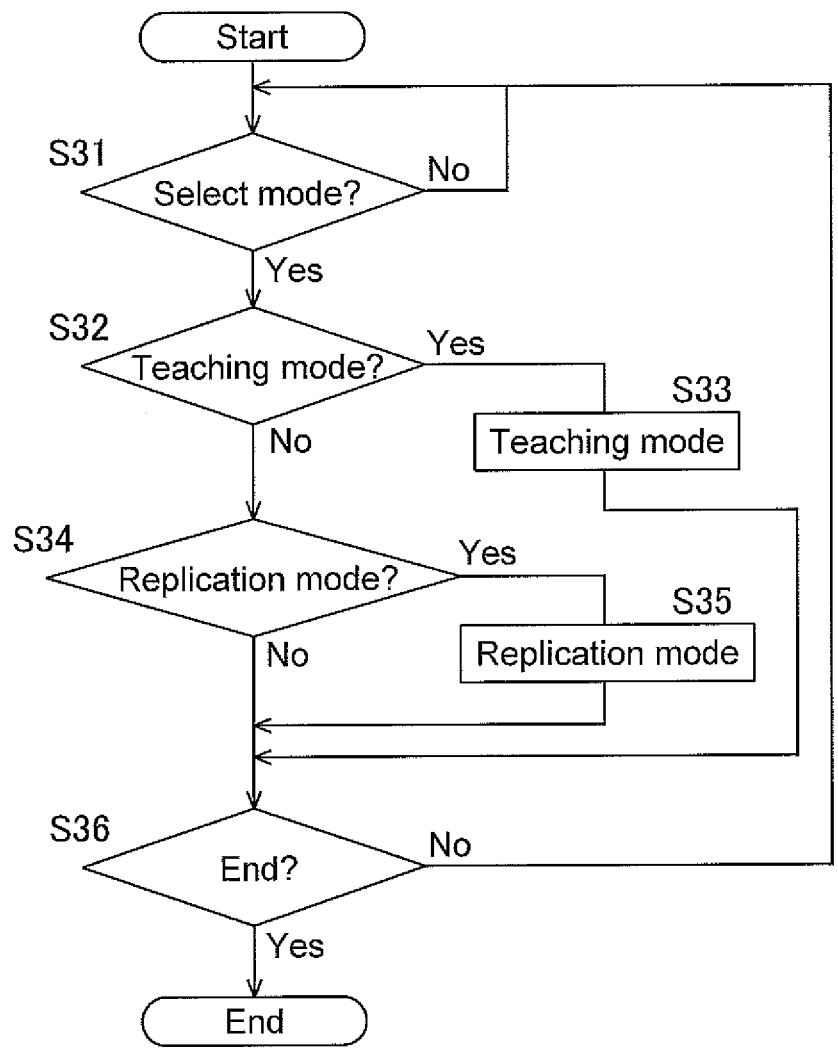
FIG. 3 is a flowchart showing the process of controlling an autonomous moving body.

FIG. 3 is a flowchart showing the process of controlling an autonomous moving body. In the description below, the functional blocks of the teaching data generation unit 24, the SLAM processing unit 63, the obstacle information obtaining unit 21, and the travelling control unit 26 preferably are achieved by the control unit 11 by executing a predetermined program or programs.

In step S31, the control unit 11 determines whether the mode is selected by the operator or not. Specifically, if the control unit 11 receives the instruction input by the operator using the operation unit 32 or the instruction input signal from the remote controller, the process proceeds to step S32.

In step S32, the control unit 11 determines whether the mode that has been selected is the teaching mode or not. If the control unit 11 determines that the instruction input showing that the teaching mode has been selected is received, the process proceeds to step S33. Otherwise, the process proceeds to step S34.

In step S33, the control unit 11 executes the teaching mode and then the process proceeds to step S36.

In step S34, the control unit 11 determines whether the mode that has been selected is the replication mode or not. If the control unit 11 determines that the instruction input showing that the replication has been selected is received, the process proceeds to step S35.

In step S35, the control unit 11 executes the replication mode and then the process proceeds to step S36.

In step S36, the control unit 11 determines whether the end instruction has been received or not, or whether the travelling schedule has been terminated or not. Specifically, if the instruction input by the operator using the operation unit 32 showing that the process is terminated is received, if the instruction input signal from the remote controller showing that the process is terminated is received, or if the control unit 11 determines that the travelling schedule that is generated in the teaching mode has been terminated, the process is terminated. Otherwise, the process proceeds to step S31.

Figure 4:
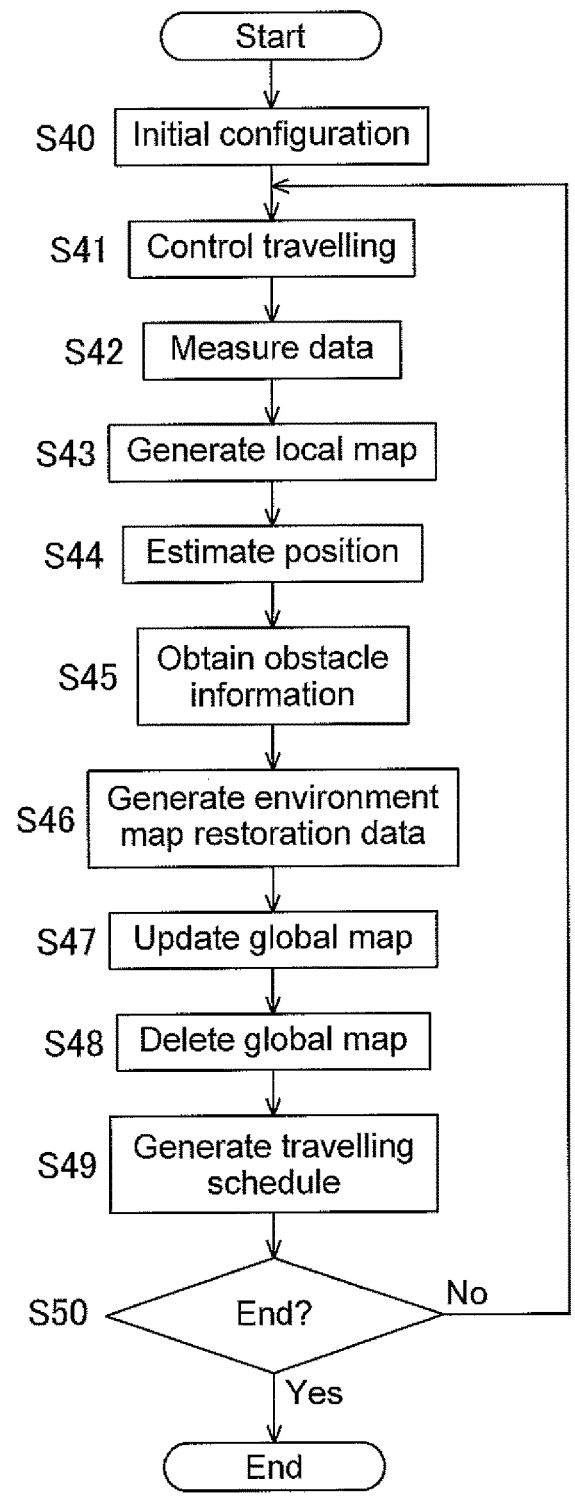
FIG. 4 is a flowchart showing the control of an autonomous moving body in a teaching mode.

FIG. 4 is a flowchart showing the control of the autonomous moving body in a teaching mode.

In step S40, the control unit 11 executes the initial configuration. Specifically, the control unit 11 obtains the position information of the obstacles around the autonomous moving body 1 based on the detection signals from the front laser range sensor 53 and the rear laser range sensor 54, and generates the local map around the autonomous moving body 1 based on the position information.

Figure 5:
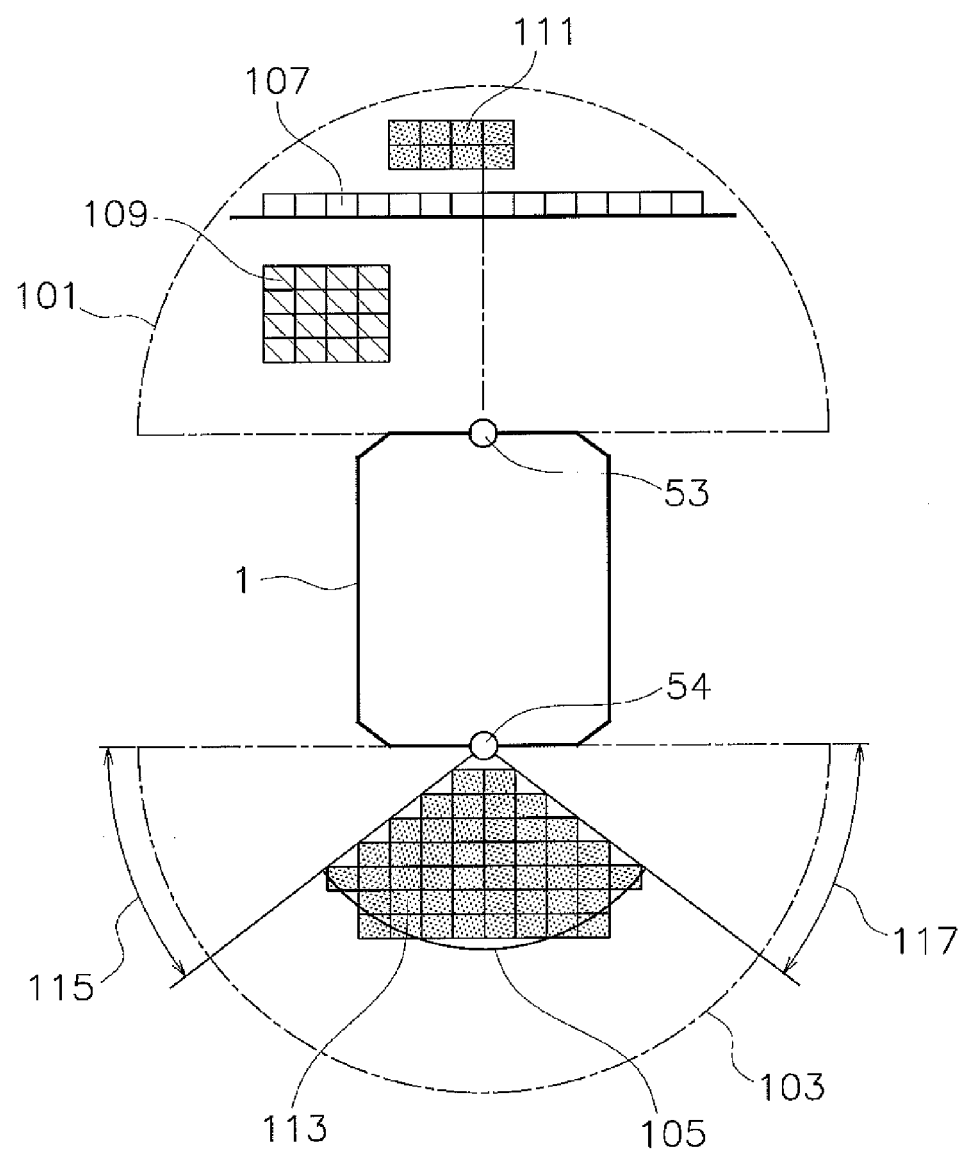
FIG. 5 is a schematic view showing one example of a scan area of laser range sensors.

FIG. 5 is a schematic view showing one example of the scan area of the laser range sensors.

The autonomous moving body 1 has the front laser range sensor 53 at its front end, which scans the pulse-oscillated laser light in a fan shape using the rotating mirror, and then receives the reflection light reflected from the obstacles existing in front of the autonomous moving body 1.

In the example shown in FIG. 5, the front laser range sensor 53 transmits the laser light in a scan area 101 with the angle range of approximately 180 degrees in the front direction. The front laser range sensor 53 detects the distance to the obstacles by receiving the reflection light reflected by the obstacles at the predetermined period and comparing the transmitted pulses of the transmitted laser light with the received pulses of the received reflection light.

The rear laser range sensor 54 is attached to the rear end of the autonomous moving body 1. The rear laser range sensor 54, like the front laser range sensor 53, scans the pulse-oscillated laser light in a fan shape using the rotating mirror, and then receives the reflection light reflected from the obstacles existing in back of the autonomous moving body 1.

In the example shown in FIG. 5, the rear laser range sensor 54 transmits the laser light in a scan area 103 with the angle range of approximately 180 degrees in the back direction. In this case, the autonomous moving body 1 defines a mask area 105 in which the obstacles are not detected, and detects the position information of the obstacles existing in a first scan area 115 and a second scan area 117. It should be noted that the mask area 105 is defined in the area of the back direction in which the operator exists.

Figure 6:
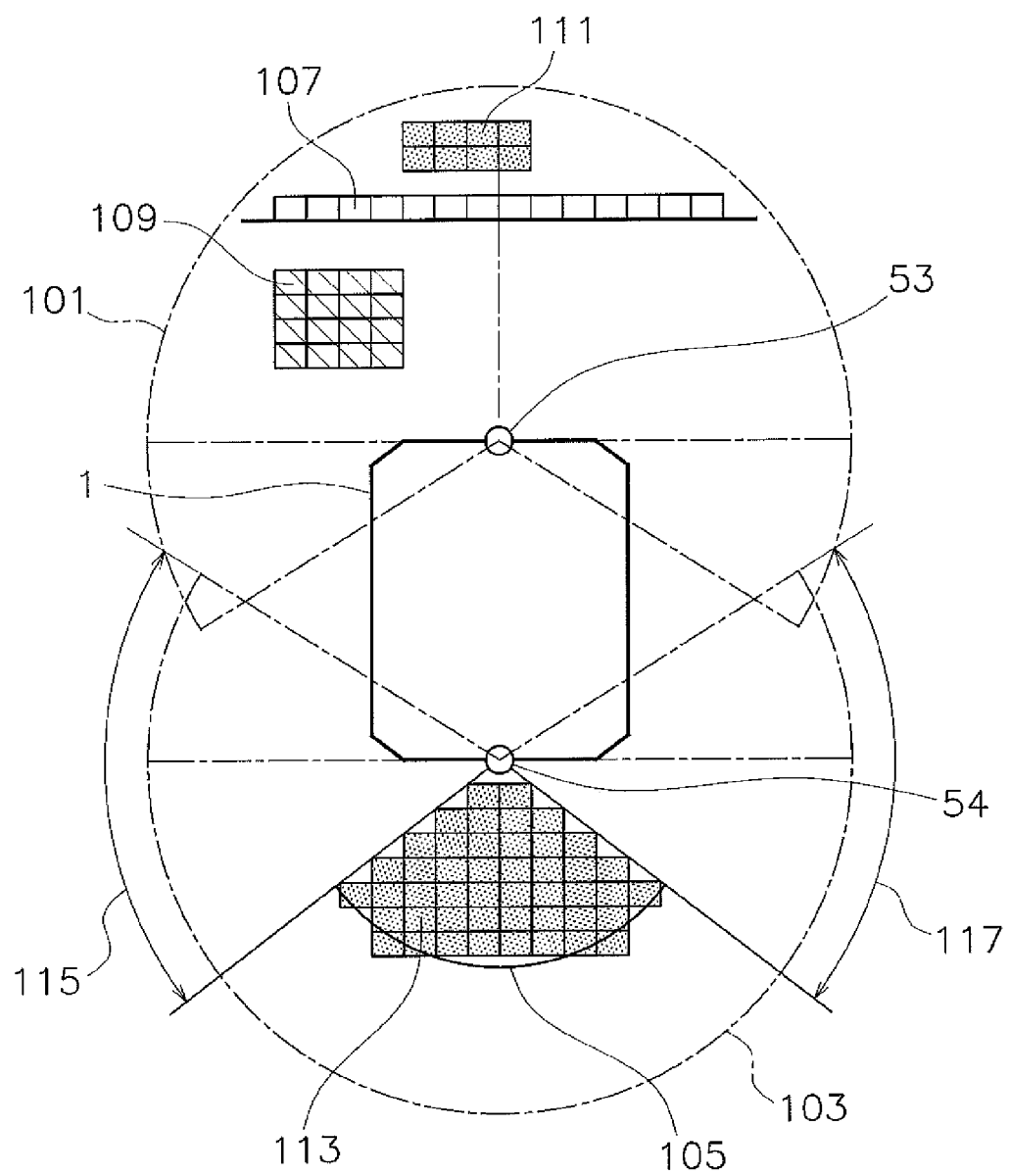
FIG. 6 is a schematic view showing another example of a scan area of laser range sensors.

FIG. 6 is a schematic view showing another example of the scan area of the laser range sensors. The difference is that the front laser range sensor 53 and the rear laser range sensor 54 scan the laser lights with the angle range of approximately 240 degrees in the example shown in FIG. 6, while the front laser range sensor 53 and the rear laser range sensor 54 scan the laser lights with the angle range of approximately 180 degrees in the example shown in FIG. 5.

Specifically, the scan area 101 of the front laser range sensor 53 has the angle range of 240 degrees in the front direction. In addition, the scan area 103 of the rear laser range sensor 54 has the angle range of 240 degrees in the back direction and detects the position information of the obstacles existing in the first scan area 115 and the second scan area 117 except to the mask area 105.

Figures 7, 8:
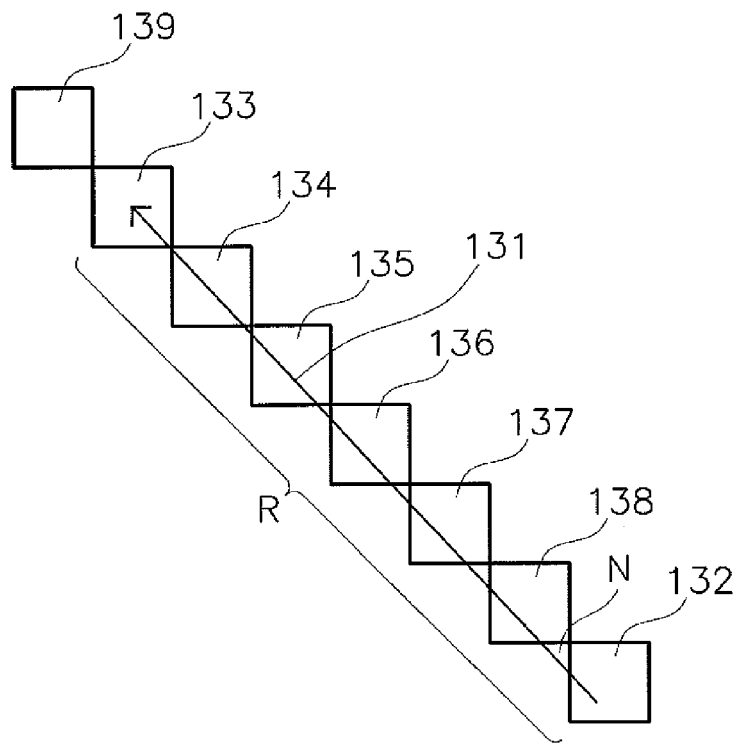
FIG. 7 is a table showing one example of position information of obstacles detected by laser range sensors.
FIG. 8 is a schematic view showing a local map on a coordinate system in which a sensor exists at the center of the coordinate system.

FIG. 7 is a table showing one example of the position information of the obstacles detected by the laser range sensors.

The front laser range sensor 53 and the rear laser range sensor 54 radiate the laser lights into the predetermined scan areas, receive the reflection light from the obstacles, and then calculate the distances R to the obstacle as outputs based on the transmitted pulses of the radiated laser light and the received pulses of the received reflection light. In addition, the front laser range sensor 53 and the rear laser range sensor 54 output the angles of sensors N when the distance R to the obstacles is obtained.

The control unit 11 obtains the outputs from the front laser range sensor 53 and the rear laser range sensor 54 at every predetermined angle and generates a position information table associating the angles of sensors N with the distances R to the obstacle, based on the outputs. The position information table shown in FIG. 7 is generated by obtaining the sensor outputs at every approximately 0.72 degree, for example, and generating the position information table of the obstacle.

The control unit 11 executes the generation of the local map on the sensor coordinate system. Specifically, the control unit 11 generates the local map that is the environment map in the vicinity of the autonomous moving body 1 on the coordinate system in which the sensor exists at the center of the coordinate system, based on the position information table of the obstacles obtained by the front laser range sensor 53 and the rear laser range sensor 54 (for example, the position information table of the obstacle shown in FIG. 7).

For example, as shown in FIG. 5 and FIG. 6, the control unit 11 divides the scan areas 101, 103 that are scanned by the front laser range sensor 53 and the rear laser range sensor 54 into grids having the predetermined areas, and then calculates obstacle existing probabilities of the grids based on the position information table of the obstacles.

FIG. 8 is a schematic view showing the local map on the coordinate system in which the sensor exists at the center of the coordinate system.

The control unit 11 determines the obstacle existing probabilities of the grids on the scan line 131, in which the center of the front laser range sensor 53 or the rear laser range sensor 54 is an origin 132, corresponding to the angle N of the sensor in the position information table of the obstacle. Here, the obstacle existing probability of the grid in which the obstacle exists is defined as "1.0", the obstacle existing probability of the grid in which it is unknown whether the obstacle exists or not is defined as "0", and the obstacle existing probability of the grid between the obstacle and the origin is defined as "$-1.0 \le -1+(r/R)^2 \le 0$", where r is the distance from the origin 132."

The control unit 11 defines the grid on the scan line 131 where the distance r coincides with the distance R to the obstacle as a detection grid 133, and defines the obstacle existing probability of the detection grid as "1.0."

The control unit 11 determines that the obstacle does not exist in the grid on the scan line 131 where the distance r is less than the distance R to the obstacle. In FIG. 8, the obstacle existing probabilities of middle grids 134-138 between the origin 132 and the detection grid 133 are defined as "$-1.0 \le -1+(r/R)^2 \le 0$."

The control unit 11 determines that it is unknown whether the obstacle exists or not in the grid on the scan line 131 where the distance r is larger than the distance R to the obstacle and defines the obstacle existing probability of a unknown grid 139 as "0."

In this manner, as shown in FIG. 5 or FIG. 6, on the sensor coordinate system in which the sensors 53, 54 exist at the center, the local map, which includes the detection grids 107, the middle grids 109, and the unknown grids 111, is generated.

It should be noted that the grids in the mask area 105 of the rear laser range sensor 54 are the unknown grids 113 and the obstacle existing probabilities of these grids are defined as "0".

In the examples shown in FIG. 5 and FIG. 6, the detection grids 107 exist in line in front of the autonomous moving body 1 and therefore it is possible to predict that a wall or a large obstacle that defines the travelling route exists.

As such, in the process of generating the local map on the sensor coordinate system, the obstacle existing probabilities of the grids, which exist in the surrounding area in which the front laser range sensor 53 and the rear laser range sensor 54 exist at the center, are calculated, and the obstacle existing probabilities of the grids are outputted as the local map on the sensor coordinate system.

In the initial configuration of step S40, as described above, the obstacle information obtaining unit 21 obtains the position information of the obstacles from the detection signals of the front laser range sensor 53 and the rear laser range sensor 54, and the map generation unit 22 generates the local map around the autonomous moving body 1. The control unit 11 regards the local map as the global map such that the origin (or the predetermined coordinate) of the absolute coordinate system is the self-position (x1, y1, θ1) that includes the coordinate of the self-position and an orientation at time t1 at which the position information of the obstacles has been obtained.

At this timing, the control unit 11 determines whether the present self-position (x1, y1, θ1) is appropriate for the starting position or not. For example, if it is difficult to determine the starting position in the replication mode because, for example, no or a small number of obstacles exist around the autonomous moving body or the shapes of the obstacles are too simple, the control unit 11 notifies the operator that the present self-position is not appropriate for the starting position by the display 33 or the speaker 57, and instructs the operator to change the starting position.

If the control unit 11 determines that the self-position (x1, y1, θ1) is appropriate for the starting position, the control unit 11 associates the position information of the obstacles obtained by the obstacle information obtaining unit 21 with time (t1) and stores it as the environment map restoration data in the storing unit 25.

In addition, the control unit 11 stores in the storing unit 25 a passing point data (x1, y1, θ1, t1) as the travelling schedule that is generated by associating the self-position (x1, y1) with the orientation of the autonomous moving body (θ1) and time (t1).

Moreover, the control unit 11 stores temporarily in the storing unit 25 a portion of the global map that is generated by the map generation unit 22 and in which the self-position (x1, y1, θ1) exists at the center.

In step S41, the control unit 11 generates the control value of the actuators of the travelling unit 27 and outputs it to the travelling unit 27. In the teaching mode, the control unit 11 receives the instruction inputs of the travelling speed and the steerage inputted by the operator's operation of the throttle 42 and performs the travelling control in the travelling route. The instruction inputs by the operator may be the instruction input signals received from the remote controller by radio.

In step S42, the control unit 11 executes the data measurement. Specifically, the control unit 11 obtains the obstacle information related to the distances and the directions to the obstacles by radiating the laser light and receiving the reflection light reflected by the obstacles by the front laser range sensor 53 and the rear laser range sensor 54.

In addition, the control unit 11 obtains the information related to the quantity of the movement of the autonomous moving body 1 during the predetermined period. Specifically, the control unit 11 obtains the information related to the rotation positions of the motors 93, 94 from the corresponding encoders 95, 96 of the travelling unit 27 and calculates the quantity of the movement during the predetermined period.

The quantity of the movement during the predetermined period can be expressed as the quantity of the movement (dx, dy, dθ) that includes the quantity of the movement from the two dimensional coordinate (x(t−1), y(t−1)) of the autonomous moving body 1 at the previous measurement time (t−1) and the quantity of the change of the orientation.

In step S43, the control unit 11 executes the generation of the local map on the sensor coordinate system. Specifically, the local map is generated by dividing the predetermined area around the autonomous moving body 1 on the coordinate system, in which the sensor exists at the center, into the grids with the predetermined scale, and associating the calculated obstacle existing probabilities with the grids based on the position information table of the obstacles obtained by the front laser range sensor 53 and the rear laser range sensor 54 (for example, the position information table of the obstacle shown in FIG. 7).

In step S44, the control unit 11 causes the position estimation unit 23 to estimate the self-position at time (t) by adding the quantity of the movement (dx, dy, dθ) between time (t−1) and time (t) to the self-position at time (t−1). In addition, the control unit 11 executes the map matching by supposing a three dimensional grid space (x, y, θ) that includes the two dimensional coordinate (x, y) and the orientation (e), and calculating the probability distributions corresponding to the positions of the grids before and after the travelling.

Figure 9:
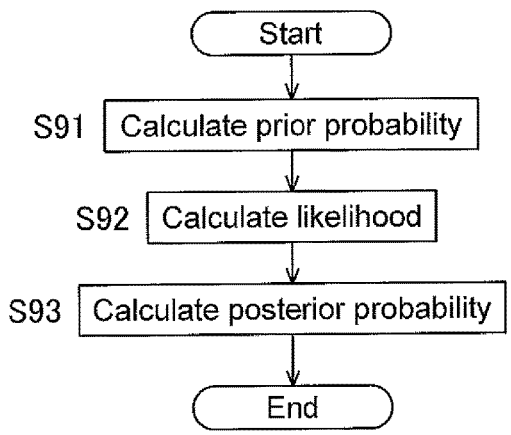
FIG. 9 is a flowchart showing the process of self-position estimation.

FIG. 9 is a flowchart showing the process of self-position estimation.

In step S91, the control unit 11 executes the calculation of a prior probability.

The control unit 11 calculates the prior probability corresponding to the self-position at time (t) using the present time (t), based on a posterior probability distribution corresponding to time (t−1) and the quantity of the movement (dx, dy, dθ) between time (t−1) and time (t).

Figure 10:
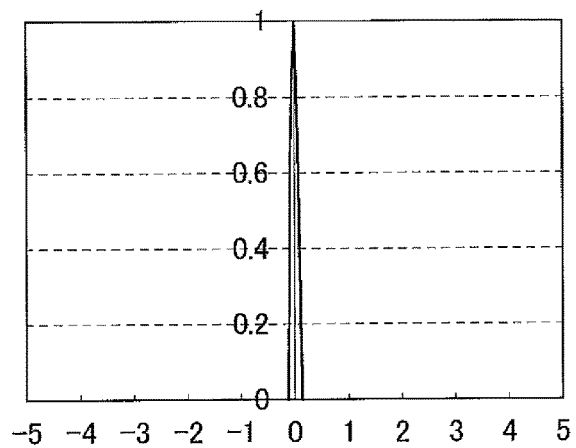
FIG. 10 is a schematic view showing one example of a posterior probability distribution.
Figure 11:
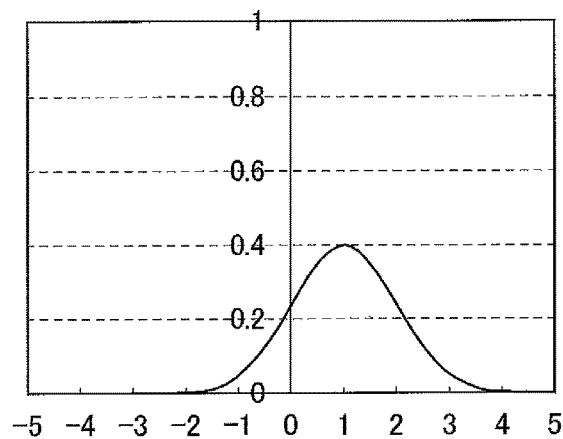
FIG. 11 is a schematic view showing one example of a prior probability distribution.

FIG. 10 is a schematic view showing one example of the posterior probability distribution. FIG. 11 is a schematic view showing one example of the prior probability distribution.

The control unit 11 shifts the coordinate by adding the quantity of the movement (dx, dy, dθ) between time (t−1) and time (t) to the posterior probability distribution corresponding to time (t−1) shown in FIG. 10. The control unit 11 then obtains the prior probability distribution corresponding to time (t) shown in FIG. 11 by the convolution of Gaussian distribution.

The control unit 11 updates the probability distribution corresponding to the self-position that is calculated by adding the quantity of the movement (dx, dy, dθ) obtained from the encoders 95, 96, while the slippages of the wheels are taken into consideration, by executing the above calculation of the prior probability at the grids of the three dimensional grid space (x, y, θ).

Figure 12:
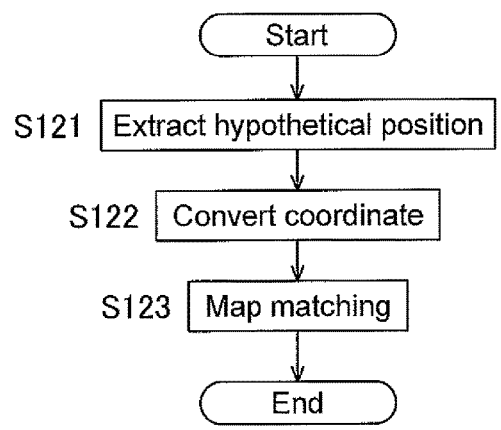
FIG. 12 is a flowchart showing the process of likelihood calculation.

In step S92, the control unit 11 executes the calculation of a likelihood. FIG. 12 is a flowchart showing the process of likelihood calculation.

In step S121, the control unit 11 extracts a coordinate of a hypothetical self-position. Specifically, the control unit 11 extracts one coordinate whose prior probability exceeds a threshold as the coordinate of the hypothetical self-position, from the coordinates whose prior probabilities corresponding to time (t) have been obtained by the prior probability calculation. The control unit calculates the likelihood corresponding to the extracted coordinate of the hypothetical self-position, based on the prior probability distribution corresponding to time (t), the local map, and the global map which is being generated.

In step S122, the control unit 11 executes the coordinate conversion. Specifically, the control unit 11 converts the local map on the sensor coordinate system to a local map on an absolute coordinate system based on the coordinate of the hypothetical self-position.

The control unit 11 calculates a coordinate (gx, gy) for each grid of the local map on the absolute coordinate system using an equation 1 by supposing (x, y, θ) as the coordinate of the hypothetical self-position extracted based on the prior probability distribution, and (lx, ly) as the coordinate of the grid of the local map on the sensor coordinate system.

$$\begin{pmatrix} g_x \\ g_y \end{pmatrix} = \begin{pmatrix} \cos(\theta) & -\sin(\theta) \\ \sin(\theta) & \cos(\theta) \end{pmatrix} \cdot \begin{pmatrix} l_x \\ l_y \end{pmatrix} + \begin{pmatrix} x \\ y \end{pmatrix} \quad \text{Equation 1}$$

In step S123, the control unit 11 executes the map matching.

The control unit 11 calculates the obstacle existing probabilities of the grids of the local map on the absolute coordinate system, based on the map matching of the global map which is being generated and the local map on the absolute coordinate system.

If the number of the grids of the local map on the absolute coordinate system whose obstacle existing probabilities are "1.0" is N, the control unit 11 calculates a score s that expresses the coincidence, using an equation 2 shown below by supposing (gx_occupy(i), gy_occupy(i)) as the coordinate of i-th grid, and GMAP(gx_occupy(i), gy_occupy(i)) as the obstacle existing probability of the coordinate (gx_occupy(i), gy_occupy(i)) of the global map.

$$s = \frac{1}{N} \cdot \sum_{i=0}^{N} GMAP(g_{x_{occupy}}(i), g_{y_{occupy}}(i)) \quad \text{Equation 2}$$

The control unit 11 calculates the scores s for the plural hypothetical self-positions as the likelihood distribution corresponding to the self-position of the autonomous moving body.

Figure 13:
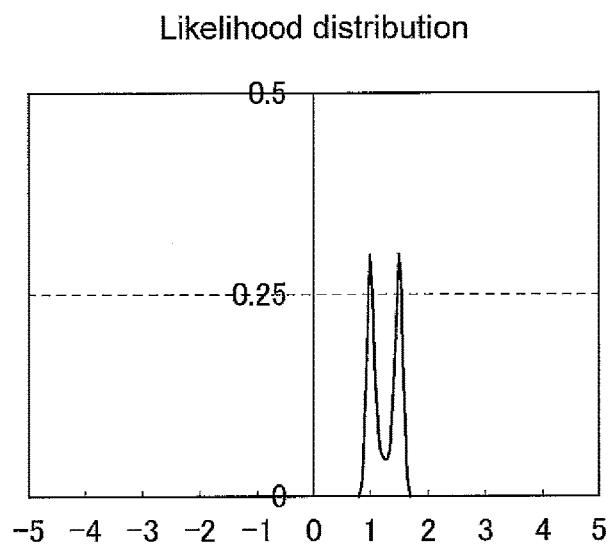
FIG. 13 is a schematic view showing a likelihood distribution obtained by likelihood calculation.

FIG. 13 is a schematic view showing a likelihood distribution obtained by likelihood calculation.

In step S93, the control unit 11 executes the calculation of the posterior probability. Specifically, the control unit 11 calculates the posterior probabilities corresponding to time (t) to the grids of the local map on the absolute coordinate system by multiplying the prior probability distribution corresponding to time (t) by the likelihood distribution corresponding to time (t).

Figure 14:
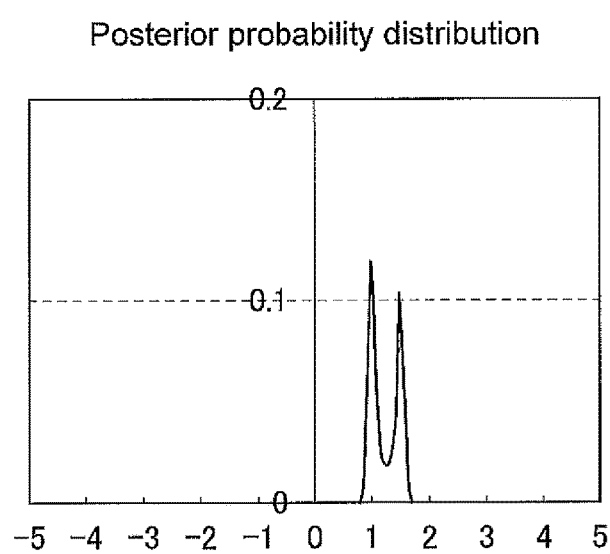
FIG. 14 is a schematic view showing one example of a posterior probability distribution obtained by posterior probability calculation.

FIG. 14 is a schematic view showing one example of a posterior probability distribution obtained by posterior probability calculation. FIG. 14 shows the posterior probability distribution obtained by multiplying the prior probability distribution corresponding to time (t) shown in FIG. 11 by the likelihood distribution corresponding to time (t) shown in FIG. 13.

The control unit 11 executes the posterior probability calculations to the plural hypothetical self-positions, and the control unit 11 then determines the hypothetical self-position whose posterior probability is maximum, as the self-position of the autonomous moving body.

With the above configuration, the difference of the prior probabilities is reflected to the posterior probabilities for the hypothetical self-positions whose likelihoods have the same value, and the self-position of the autonomous moving body is estimated based on the output signals of the front laser range sensor 53, the rear laser range sensor 54, and the encoders 95, 96 of the travelling unit 27. In addition, since the posterior probabilities corresponding to time (t−1) are used when the prior probabilities corresponding to time (t) are calculated, the disturbance factors, such as the slippages of the wheels (not shown in Figures) of the travelling unit 27, the noises of the front laser range sensor 53 and the rear laser range sensor 54, and etc., are eliminated, and thus, the self-position of the autonomous moving body is estimated accurately.

In step S45, the control unit 11 obtains the position information of the obstacles around the present self-position of the autonomous moving body on the global map by the obstacle information obtaining unit 21.

In step S46, the control unit 11 generates the environment map restoration data by associating the position information of the obstacles obtained by the obstacle information obtaining unit 21 with time, and stores the environment map restoration data in the storing unit 25.

Specifically, the environment map restoration data is generated by dividing the surrounding area around the self-position on the global map, into grid units having a predetermined area, associating the obstacle existing probabilities with the grids and then with time (t) at which the position information of the obstacles has been obtained.

In step S47, the control unit 11 executes the update process of the global map. Specifically, the control unit 11 generates the global map corresponding to time (t) by adding the local map whose coordinate is converted at the self-position estimated in the position estimation process on the absolute coordinate system to the global map corresponding to time (t−1).

FIG. 15A-15C are schematic views showing a concept of updating a global map. In the examples shown in FIGS. 15A-15C, the maps are divided into the 4×4 grids, FIG. 15A shows the global map corresponding to time (t−1), FIG. 15B shows the local map corresponding to time (t) on the absolute coordinate system, and FIG. 15C shows the updated global map corresponding to time (t).

As shown in FIGS. 15A and 15B, in the global map corresponding to time (t−1) and the local map corresponding to time (t), the obstacle existing probability is stored in each grid. As described above, the obstacle existing probability of the grid in which it is estimated that the obstacle exists is defined as "1.0", the obstacle existing probability of the grid in which it is not estimated that the obstacle exists is defined between "−1.0" and "0", the obstacle existing probability in which it is unknown whether the obstacle exists or not is defined as "0".

In the update process of the global map, the control unit 11 associates the grids of the local map (FIG. 15B) whose coordinate system has been converted to the absolute coordinate system, with the grids of the global map (FIG. 15A), and then adds the obstacle existing probabilities of the grids, based on the estimated self-position in the position estimation process.

If the obstacle existing probability becomes more than "1.0" or less than "−1.0" by the calculation, the control unit 11 sets these obstacle existing probabilities to "1.0" or "−1.0" respectively by omitting the fractions. As such, the obstacle existing probability of the grid in which the obstacle continuously exists is kept close to "1.0", on the other hand, the obstacle existing probability of the grid in which the obstacle does not exist continuously is kept close to "−1.0".

In the manner described above, the control unit 11 updates the global map by calculating the obstacle existing probabilities of the grids of the global map corresponding to time (t) shown in FIG. 15C.

The global map corresponding to time (t) includes the area required to execute the position estimation process for at least next time (t+1), and is stored temporarily in the storing unit 25.

The influences of the slippage of the wheels and the noises due to the measurement errors of the sensors are reduced as much as possible, because the obstacle existing probabilities of the grids of the global map are updated by adding the corresponding obstacle existing probabilities of the grids of the local map on the absolute coordinate system in the update process of the global map.

In step S48, the control unit 11 deletes the global map for the passing point where the autonomous moving body 1 has passed.

As described above, what is really required in the global map to be updated at time (t) is only the area required to execute the position estimation process by the control unit 11 at the next time (t+1). Therefore, the area that is not required to execute the position estimation process by the control unit 11 at the next time (t+1) is deleted in step S48. Thus, the problem in which the looped route is not closed in the environment map does not need to be taken into consideration.

Figure 16:
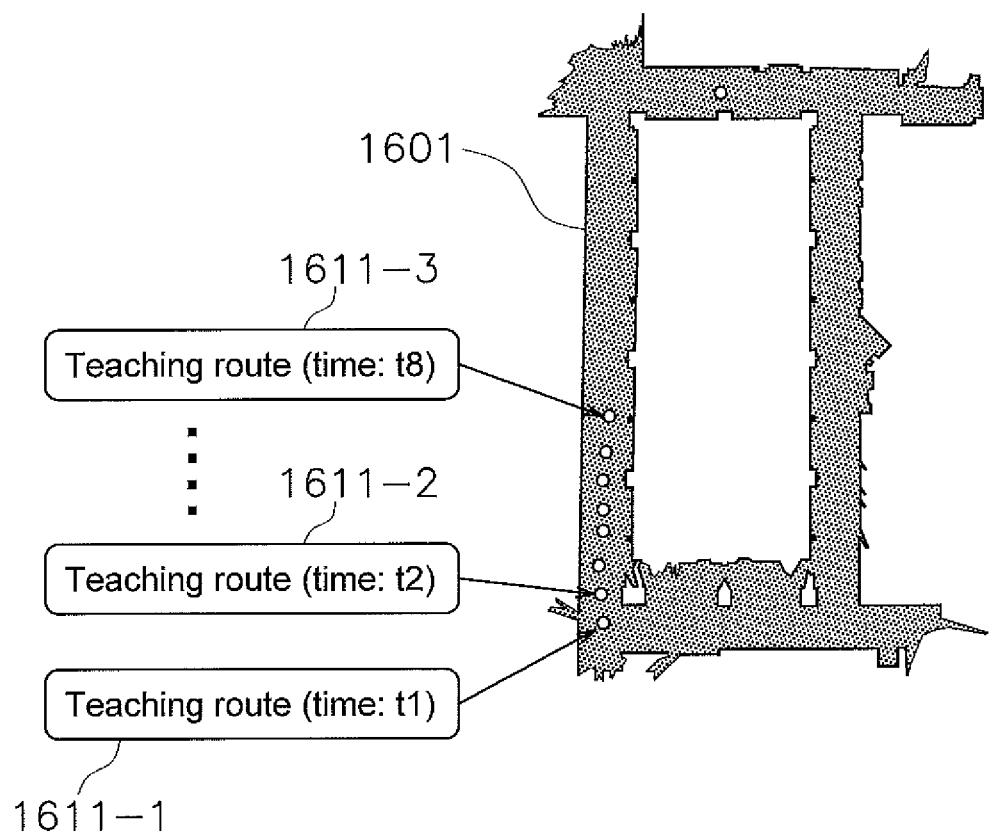
FIG. 16 is a schematic view showing a travelling schedule
Figure 17:
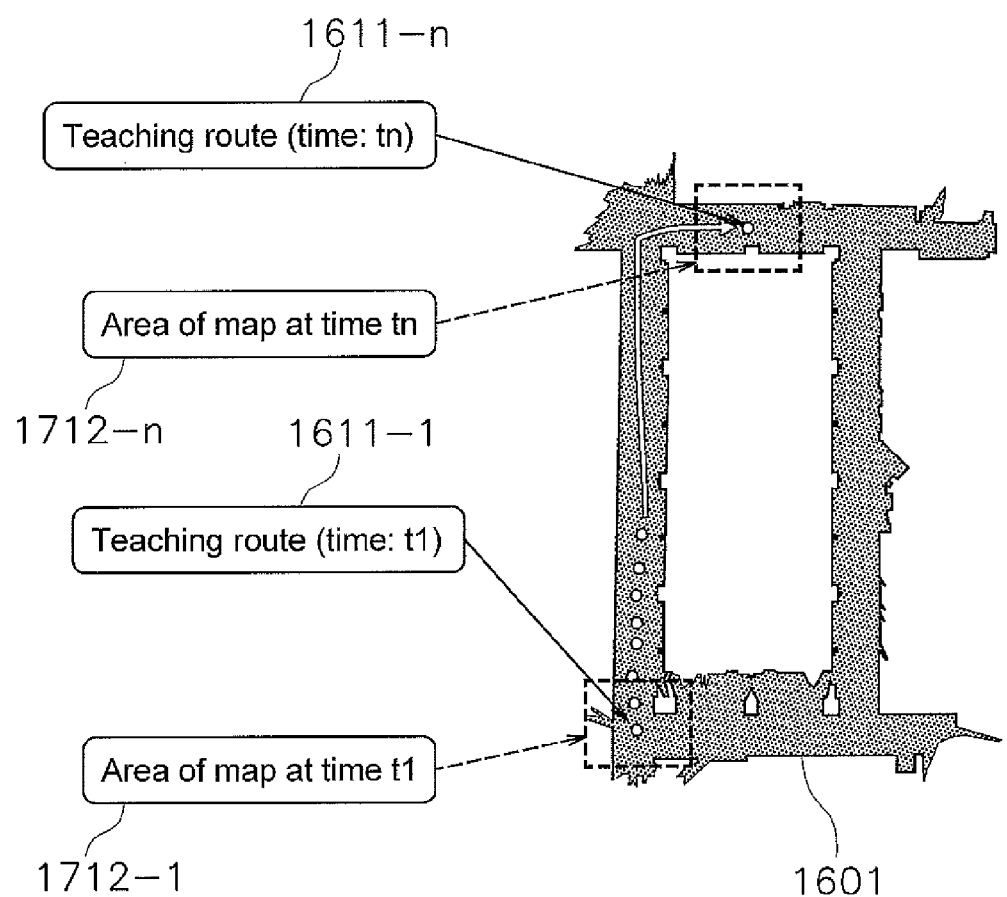
FIG. 17 is a schematic view showing the update and deletion of a global map.
Figures 18A, 18B:
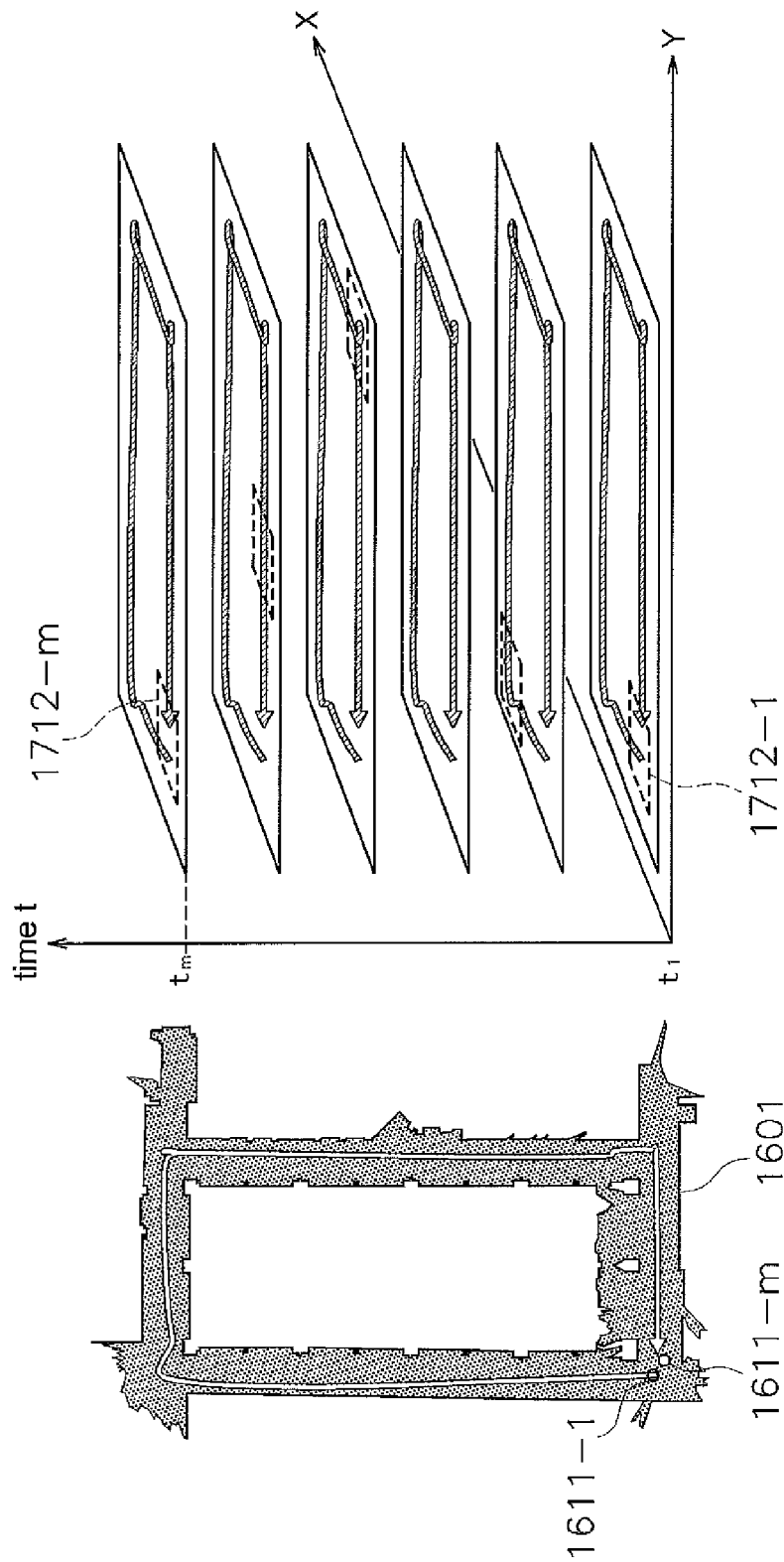
FIGS. 18A and 18B are schematic views showing a looped travelling route.

FIG. 16 is a schematic view showing a travelling schedule. FIG. 17 is a schematic view showing the update and deletion of a global map. FIGS. 18A and 18B are schematic views showing a looped travelling route.

As shown in FIG. 16, it is supposed that, in the teaching mode, the autonomous moving body 1 travels along the passing point 1611-1 . . . on the looped travelling route 1601, based on the manual operation of the operator.

As shown in FIG. 17, at the passing point 1611-1 corresponding to time (t1), the control unit 11 generates the local map 1712-1 having the predetermined area around the self-position of the autonomous moving body and updates the global map using this local map. Likewise, at the passing point 1611-*n* corresponding to time (tn), the control unit 11 generates the local map 1712-*n* having the predetermined area around the self-position of the autonomous moving body and updates the global map using this local map. Here, the control unit 11 deletes from the global map the data for the area more than a constant distance away from the present passing point 1611-*n*.

As shown in FIGS. 18A and 18B, the global map is updated using the local map 1712-*m* corresponding to the passing point 1611-*m* corresponding to time (tm) and includes the area where the global map is overlapped with the global map updated using the local map 1712-1 corresponding to time (t1).

As described above, since the area more than the constant distance away from the present self-position of the autonomous moving body is deleted from the global map, when the autonomous moving body 1 reaches the passing point 1611-*m* corresponding to time (tm), the data of the global map updated using the local map 1712-1 corresponding to time (t1) has already been deleted. This prevents the global map updated using the local map from being overlapped with the previously-generated global map at the coordinate close to the present self-position. As the result, the problem in which the looped route is not closed is prevented even if the wheels are slipped and the sensors generate the measurement errors.

In step S49, the control unit 11 causes the teaching data generation unit 24 to generate the travelling schedule and store it in the storing unit 25. Specifically, while the autonomous moving body 1 travels along the passing point 1611-1 ... on the travelling route 1601 as shown in FIG. 17, the control unit 11 stores in the storing unit 25 a passing point data (x, y, θ, t) that includes the coordinate (x, y) on the global map that corresponds to the passing point 1611 corresponding to time t on the travelling route 1601, the orientation (θ) that shows the travelling direction of the autonomous moving body 1, and time (t).

While the autonomous moving body 1 passes the passing point 1611-1, 1611-2, ... 1611-n at times t1, t2, ..., based on the predetermined time period (time schedule), the teaching data generation unit 24 stores in the storing unit 25 the travelling schedule that includes a set of passing point data (x1, y1, θ1, t1), (x2, y2, θ2, t2), ... (xn, yn, θn, tn) at a first passing point 1611-1, a second passing point 1611-2, ... a n-th passing point 1611-n, respectively.

In step S50, the control unit 11 determines whether the end instruction has been received or not. Specifically, if the instruction input is inputted by the operator via the operation of the operation unit 32 that shows that the process should be terminated, or if the instruction input signal that shows that the process should be terminated is received from the remote controller, the control unit 11 terminates the process by executing the termination process. Otherwise, the process proceeds to step S41.

Figure 19:
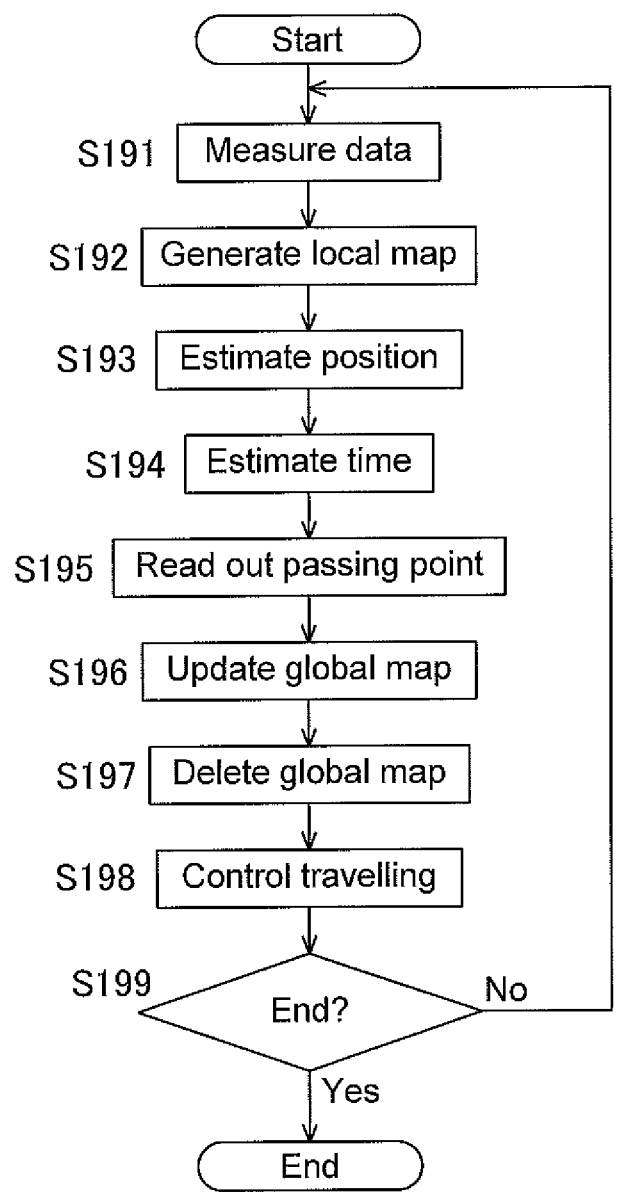
FIG. 19 is a flowchart showing the control of an autonomous moving body in a replication mode.

FIG. 19 is a flowchart showing the control of an autonomous moving body in a replication mode.

In step S191, the control unit 11 executes the data measurement process. Specifically, the control unit 11 obtains the obstacle information related to the distance and direction to the obstacles by radiating the laser light and receiving the reflection light reflected by the obstacles by the front laser range sensor 53 and the rear laser range sensor 54. The detailed explanation of the data measurement process executed here will be omitted because the data measurement process executed here is the same as the data measurement process executed in the teaching mode.

In step S192, the control unit 11 executes the generation process of the local map on the sensor coordinate system. Specifically, the local map is generated by associating the grids in the vicinity of the self-positions of the autonomous moving body on the coordinate system in which the sensor exists at the center, with the obstacle existing probabilities, based on the position information table of the obstacles (for example, the position information table of the obstacles shown in FIG. 7) obtained by the front laser range sensor 53 and the rear laser range sensor 54.

In step S193, the control unit 11 causes the position estimation unit 23 to estimate the self-position on the global map. Like the position estimation process in the teaching mode, the self-position at time (t) is estimated by adding the quantity of the movement (dx, dy, dθ) between time (t−1) and time (t) to the self-position at time (t−1). In addition, the control unit 11 estimates the self-position by supposing the three dimensional grid space (x, y, θ) that includes the two dimensional coordinate (x, y) and the orientation (e), and executing the map matching by calculating the probability distributions corresponding to the position of the grids before and after the travelling.

In step S194, the control unit 11 restores the global map using the environment map restoration data corresponding to the estimated self-position and estimates the time in the travelling schedule corresponding to the present self-position by comparing the restored global map and the local map generated from the position information of the obstacles obtained by the obstacle information obtaining unit 21.

In step S195, the control unit 11 reads out from the storing unit 25 the passing point data corresponding to the estimated time from the travelling schedule stored in the storing unit 25.

In step S196, the control unit 11 updates the global map using the environment map restoration data corresponding to the estimated self-position. Specifically, the obstacle existing probabilities of the grids of the global map are updated by adding the obstacle existing probabilities of the grids of the global map restored in step S195 to the obstacle existing probabilities of the grids of the global map that has already been generated.

In step S197, the control unit 11 deletes the global map for the passing point which the autonomous moving body 1 has passed. Here, like in the teaching mode, when the global map is updated at time (t), the area that is not required to execute the position estimation process by the control unit 11 at the next time (t+1) is deleted from the global map.

In step S198, the control unit 11 generates the control value of the actuators of the travelling unit 27 and outputs it to the travelling unit 27. Specifically, the control unit 11 determines the control value of the actuators in accordance with the travelling schedule based on the self-position on the global map and the passing point data readout from the storing unit 25, and outputs a travelling instruction based on the determined control value to the travelling unit 27.

In step S199, the control unit 11 determines whether the replication mode should be terminated or not. Specifically, if the autonomous moving body 1 reaches the final passing point of the travelling schedule stored in the storing unit 25, if the operator operates the emergency switch 56, if the bumper switch 55 detects that the autonomous moving body 1 collides with the obstacle, or if it is determined that the distance between the autonomous moving body 1 and the obstacle is less than the predetermined distance, the control unit 11 determines that the replication mode should be terminated. If the control unit 11 determines that the replication mode should not be terminated, the process proceeds to step S191.

As described above, in the teaching mode, the environment map restoration data for restoring the global map and the travelling schedule that includes a set of the passing point data are stored in the storing unit 25. For this, in the replication mode, the global map around the self-position of the autonomous moving body is restored using the environment map restoration data, and the self-position of the autonomous moving body on the restored global map is estimated. In this process, since the data of the global map that has been passed is deleted, the occurrence of the looped-route problem is avoided, namely, the inconsistencies due to the disagreement of the global maps caused by the slippage of the wheels and the measurement errors of the sensors is prevented.

In addition, in the replication mode, since the autonomous moving body 1 is controlled in accordance with the passing point data of the travelling schedule, the hindrance of the autonomous travelling caused when the autonomous moving body travels out of the coordinate system of the global map is avoided.

The above preferred embodiment of the present invention preferably has the flowing structures and functions.

The autonomous moving body 1 (one example of an autonomous moving body) executes the teaching mode and the replication mode. The teaching mode generates a travelling schedule, which includes a set of passing times and passing point data (for example, the passing point data at the passing times (x, y, θ, t)), while the autonomous moving body travels, under a manual control of a user, from a starting position to an end position. The replication mode is a mode in which the autonomous moving body autonomously travels from the starting position to the end position by replicating the travelling schedule.

The autonomous moving body 1 preferably includes a storing unit 25 (one example of a storing unit), a travelling unit 27 (one example of a travelling unit), a teaching data generation unit 24 (one example of a teaching data generation unit), a travelling control unit 26 (one example of a travelling control unit), an obstacle information obtaining unit 21 (one example of an obstacle information obtaining unit), a map generation unit 22 (one example of a map generation unit), and a position estimation unit 23 (one example of a position estimation unit).

The storing unit 25 stores data. The travelling unit 27 includes motors 93, 94 (one example of actuators) that receive a control value.

The teaching data generation unit 24 generates the travelling schedule and stores the travelling schedule in the storing unit 25. The obstacle information obtaining unit 21 obtains position information of obstacles existing in a surrounding area. The position estimation unit 23 estimates a self-position on an environment map. The environment map is generated based on the position information of the obstacles obtained by the obstacle information obtaining unit 21. When the teaching mode is executed, the map generation unit 22 stores the position information of the obstacles as environment map restoration data in the storing unit while associating the position information of the obstacles with time at which the position information of the obstacles has been obtained. On the other hand, when the replication mode is executed, the map generation unit 22 reads out the environment map restoration data corresponding to the estimated self-position to update the environment map. When the teaching mode is executed, the travelling control unit 26 generates the control value of the actuators based on a travelling instruction inputted by the user and outputs the control value to the travelling unit. On the other hand, when the replication mode is executed, the travelling control unit 26 generates the control value of the actuators such that the travelling unit 27 travels on an updated environment map in accordance with the travelling schedule, and outputs the control value to the travelling unit 27.

In this autonomous moving body 1, the environment map restoration data is generated and stored in the storing unit 25 while the operator operates manually the autonomous moving body 1. In addition, the autonomous moving body 1 travels in accordance with the travelling schedule in the replication mode, while the autonomous moving body 1 estimates the self-position on the environment map, and updates the environment map by using the environment map restoration data corresponding to the estimated self-position. As such, the autonomous moving body 1 is able to operate easily, the operator does not have to take the method of generating the environment map into consideration, and the problem of not closing the looped route caused by the slippage of the wheels and the measurement errors of the sensors is not required to be taken into consideration even if the travelling route is looped.

OTHER PREFERRED EMBODIMENTS

In the above, one preferred embodiment of the present invention has been described. However, the present invention is not limited to the above preferred embodiment, and various modifications can be made within the scope of the present invention. Especially, the preferred embodiments and the modifications described in the present description can be combined arbitrarily if required.

The control unit 11 can manage the environment map as a double layer structure of a static environment map and a dynamic environment map. The static environment map can be restored based on the map restoration data generated in the teaching mode. In addition, the dynamic environment map can be generated by overlapping the dynamic environment map corresponding to time (t) with the local map based on the position information of the obstacles around the self-position of the autonomous moving body obtained at time (t+1) by the obstacle information obtaining unit 21.

For example, it is supposed that the obstacle existing probabilities of the grids of the dynamic environment map corresponding to time (t) is DynamicMap (t), the obstacle existing probabilities of the grids of the static environment map is StaticMap. In addition, it is supposed that, the obstacle existing probabilities of grids of a differentiation map corresponding to time (t) that shows the changes of the position of the obstacles is DiffMap (t) from the static environment map.

Moreover, if P1 is a parameter that determines the range of the values of the grids of the dynamic environment map, DynamicMap (t) can be calculated as DynamicMap (t)=StaticMap*P1+DiffMap (t).

The control unit 11 estimates the self-position using the obstacle information around the autonomous moving body obtained by the obstacle information obtaining unit 21 and the static environment map restored from the environment map restoration data, and generates the local map on the absolute coordinate system.

The obstacle existing probabilities of the grids of the dynamic environment map corresponding to time (t+1) is calculated using the dynamic environment map corresponding to time (t) and the local map corresponding to time (t+1). If it is supposed that the obstacle existing probabilities of the grids of the local map on the absolute coordinate system is LocalMap (t+1), the dynamic environment map corresponding to time (t+1) can be calculated as DynamicMap (t+1)= DynamicMap (t)+LocalMap (t+1).

The control unit 11 calculates the difference between the dynamic environment map corresponding to time (t+1) and the static environment map, generates the obstacle existing probabilities DiffMap (t+1) of the grids of the differentiation map corresponding to time (t+1) as DiffMap (t+1)=DynamicMap (t+1)−StaticMap*P1, and updates the dynamic environment map using the calculated differentiation map.

Figure 20:
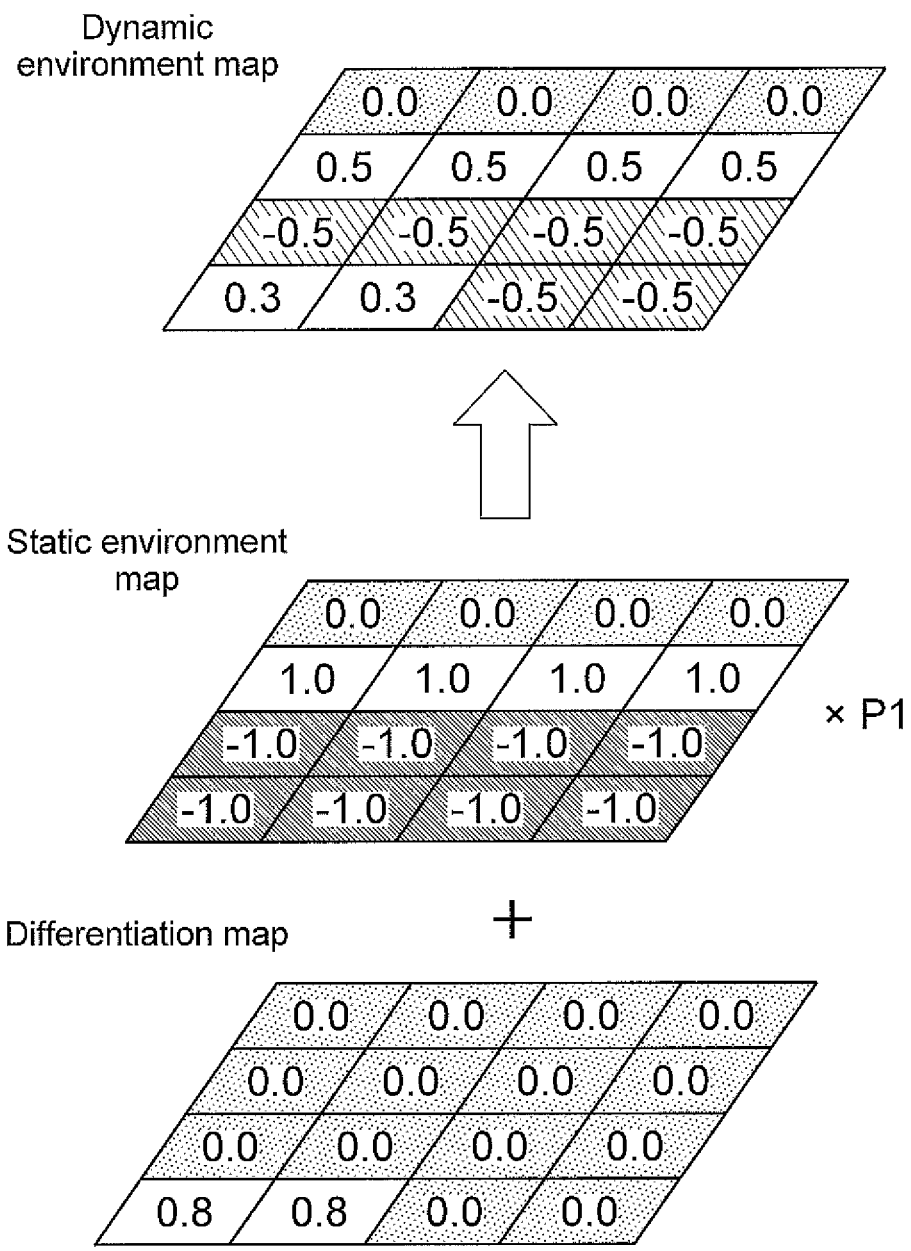
FIG. 20 is a schematic view showing the update of a dynamic environment map.

FIG. 20 is a schematic view showing the update of a dynamic environment map. In the example shown in FIG. 20, the 4×4 grids in the vicinity of the self-position of the autonomous moving body are supposed.

As shown in FIG. 20, the dynamic map corresponding to time (t) DynamicMap (t) is calculated by adding the obstacle existing probabilities of the grids of the DiffMap (t) corresponding to time (t) to the value calculated by multiplying the obstacle existing probabilities of the grids of the StaticMap and the parameter P1. The obstacle existing probabilities of the grids are defined as between −1.0 and 1.0 and the parameter P1 is defined as "0.5".

As such, the obstacle existing probabilities of the grids are calculated as DynamicMap (t)=StaticMap*P1+DiffMap (t) as shown in FIG. 20.

Figure 21:
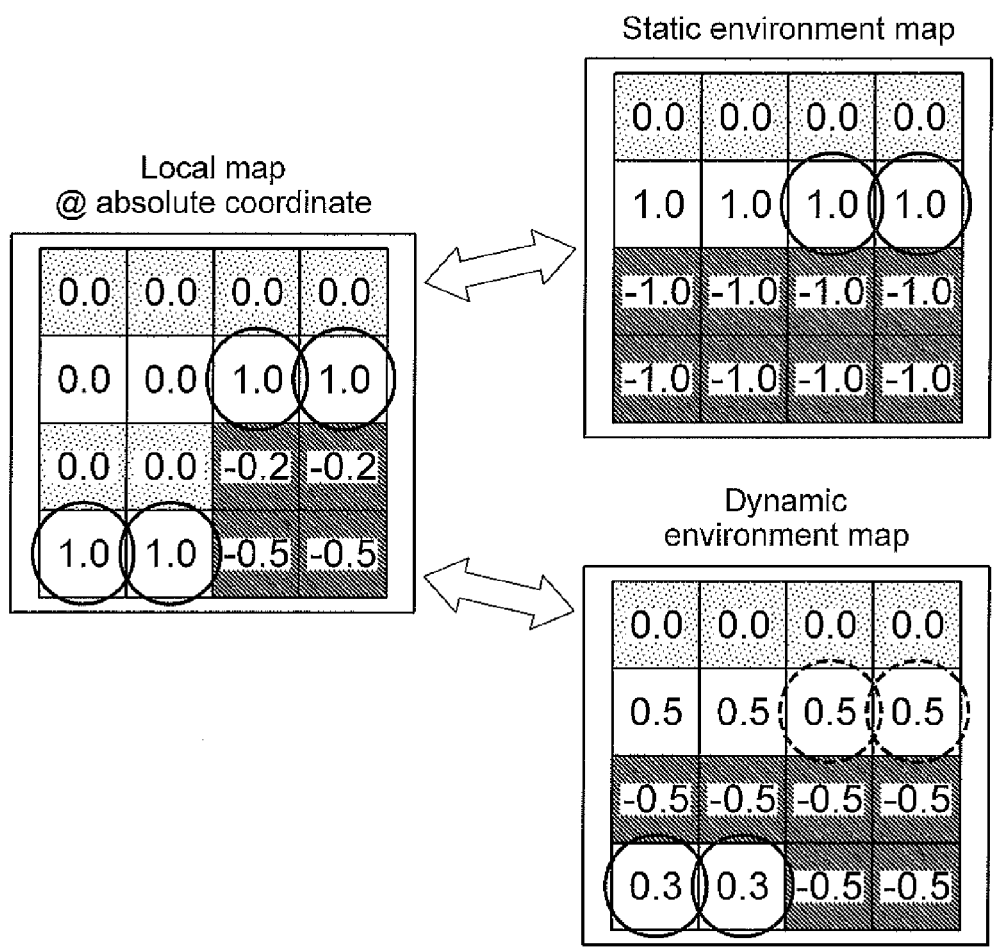
FIG. 21 is a schematic view showing a likelihood calculation in estimating a self-position.

FIG. 21 is a schematic view showing a likelihood calculation in estimating a self-position. The example shown in FIG. 21 has 4×4 grids in the vicinity of the self-position of the autonomous moving body.

In the local map on the absolute coordinate system, when the number of the grids whose obstacle existing probabilities are "1.0" is N, it is supposed that the coordinate of i-th grid is (gx_occupy (i), gy_occupy (i)). It is supposed that the obstacle existing probability of the coordinate of the static environment map (gx_occupy (i), gy_occupy (i)) is Static-Map (gx_occupy (i), gy_occupy (i)), and the obstacle existing probability of the coordinate of the dynamic environment map (gx_occupy (i), gy_occupy (i)) is DynamicMap (gx_occupy (i), gy_occupy (i)).

By using the equation below, the likelihood calculation is performed to the grids whose obstacle existing probabilities are "1.0" in the local map on the absolute coordinate system by using the static environment map or the dynamic environment map whose obstacle existing probabilities are higher.

$$s = \frac{1}{N} \cdot \sum_{i=0}^{N} \text{Max}(StaticMap(g_{x_{occupy}}(i), g_{y_{occupy}}(i)), \quad \text{Equation 3}$$
$$DynamicMap(g_{x_{occupy}}(i), g_{y_{occupy}}(i)))$$

As such, the likelihood is calculated as s=(1.0+1.0+0.3+0.3)/4=0.65 in the example shown in FIG. 21.

In the case where the autonomous moving body travels on the travelling route shown in FIG. 17, on the passing point 1611-1 corresponding to time (t1), the control unit 11 generates the dynamic environment map updated in the predetermined area positioned around the autonomous moving body by using the local map 1712-1. Likewise, on the passing point 1611-n corresponding to time (tn), the control unit 11 generates a partial global map updated in the predetermined area around the autonomous moving body by using the local map 1712-n. Here, the control unit 11 deletes the dynamic environment map generated at the passing point (not shown in the figures) corresponding to time (tn−1) and updates the dynamic environment map using the local map 1712-n corresponding to time (tn).

As such, the problem in which the looped route is not closed is prevented even if the global map includes two layers of the static environment map and the dynamic environment map because the dynamic environment map generated corresponding to time (t1) is deleted at the passing point 1611-m corresponding to time (tm) of FIGS. 18A and 18B.

In addition, the change of the position of the obstacles is able to be detected using the differentiation map even if the position information of the obstacles is changed when restoring the static environment map using the environment map restoration data generated in the teaching mode. Therefore, the autonomous moving body 1 avoids colliding with the obstacle in accordance with the change of the layout on the travelling route and the existence of the moving body.

Various preferred embodiments of the present invention can be applied to a cleaning robot, a conveying robot, and other autonomous moving bodies that perform autonomous travelling.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An autonomous moving body comprising:
a travelling unit including at least one motor and at least one wheel; and
control circuitry including a travelling controller that generates a control value and outputs to the control value to the travelling unit; wherein
the at least one motor drives the at least one wheel according to the control value;
the autonomous moving body executes a teaching mode and a replication mode;
the teaching mode is a mode in which a travelling schedule is generated while the autonomous moving body travels from a starting position to an end position, the travelling schedule including a set of passing times and passing point data at the passing times; and
the replication mode is a mode in which the autonomous moving body autonomously travels from the starting position to the end position by replicating the travelling schedule.

2. The autonomous moving body according to claim 1, wherein:
the control circuitry further includes:
a memory that stores data; and
a teaching data generator that generates the travelling schedule and stores the travelling schedule in the memory when executing the teaching mode;
when the teaching mode is executed, the travelling controller generates the control value of the at least one motor according to a travelling instruction input by a user and outputs the control value to the travelling unit, and, when the replication mode is executed, travelling controller generates the control value of the at least one motor such that the travelling unit travels in accordance with the travelling schedule and outputs the control value to the travelling unit.

3. The autonomous moving body according to claim 2, further comprising:
an obstacle information detector that obtains position information of obstacles existing in an surrounding area;
a map generator that, when the teaching mode is executed, stores the position information of the obstacles as environment map restoration data in the storage while associating the position information of the obstacles with a time at which the position information of the obstacles has been obtained, and, when the replication mode is executed, reads out the environment map restoration data corresponding to the estimated self-position to update the environment map; and
a position estimator that estimates a self-position on an environment map, the environment map being generated based on the position information of the obstacles obtained by the obstacle information detector; wherein
the travelling controller, in the replication mode, generates the control value of the at least one motor such that the travelling unit travels on an updated environment map in accordance with the travelling schedule and outputs the control value to the travelling unit.

4. The autonomous moving body according to claim 3, wherein the teaching data generator associates the self-position and an orientation on the environment map as the passing point data, with the time at which the position information of the obstacles has been obtained at every predetermined time schedule, when the teaching mode is executed.

5. The autonomous moving body according to claim 3, wherein, when the replication mode is executed, at every predetermined time schedule, the map generator updates the environment map that has already been generated, based on the environment map restoration data corresponding to a time later than a time of a present passing point.

6. The autonomous moving body according to claim 5, further comprising a map matching controller that generates a local map based on the position information of the obstacles obtained by the obstacle information detector, compares the updated environment map with the generated local map, and corrects the self-position and the orientation estimated by the position estimator based on a result of a comparison of the generated local map and the updated environment map; wherein
the passing point data in the travelling schedule corresponding to the self-position on the environment map is estimated based on the result of the comparison performed by the map matching controller.

7. The autonomous moving body according to claim 3, wherein the map generator deletes data of the environment map for an area that has already been passed, at every predetermined time schedule.

8. A method of generating a travelling schedule, the travelling schedule including a set of passing times and passing point data at the passing times, while an autonomous moving body travels from a starting position to an end position, the method comprising:
controlling at least one motor of the autonomous moving body to drive at least one wheel of the autonomous moving body in response to a travelling instruction input by a user;
estimating a self-position on an environment map;
obtaining position information of obstacles around the autonomous moving body;
storing the position information of the obstacles as environment map restoration data while associating the position information of the obstacles with time at which the position information of the obstacles has been obtained; and
generating the travelling schedule based on the estimated self-position.

9. The method of generating the travelling schedule according to claim 8, wherein, in generating the travelling schedule, the self-position and an orientation on the environment map as the passing point data are associated with the time at which the position information of the obstacles has been obtained.

10. The method of generating the travelling schedule according to claim 8, further comprising deleting data of the environment map for an area that has already been passed.

11. A method of moving an autonomous moving body, in which the autonomous moving body autonomously travels from a starting position to an end position by replicating a travelling schedule, the method comprising:
estimating a self-position on an environment map;
obtaining position information of obstacles around the autonomous moving body;
updating the environment map based on an environment map restoration data corresponding to an estimated self-position; and
controlling at least one motor of the autonomous moving body to drive at least one wheel of the autonomous moving body based on a control value, the control value being generated such that the autonomous moving body travels on an updated environment map in accordance with the travelling schedule.

12. The method of moving the autonomous moving body according to claim 11, wherein, in updating the environment map based on the environment map restoration data corresponding to the estimated self-position, the environment map that has already been generated is updated based on the environment map restoration data corresponding to a time later than a time of a present passing point.

13. The method of moving the autonomous moving body according to claim 12, further comprising generating a local map based on the position information of the obstacles that is obtained, and comparing the updated environment map with the generated local map, wherein
in estimating the self-position on the environment map, the self-position and an orientation on the environment map, and a passing point data in the travelling schedule corresponding to the self-position on the environment map are estimated, in accordance with a result of comparing the updated environment map with the generated local map.

14. The method of moving the autonomous moving body according to claim 11, further comprising deleting data of the environment map for an area that has already been passed.

* * * * *